US 12,438,965 B2

(12) United States Patent
Kim et al.

(10) Patent No.: US 12,438,965 B2
(45) Date of Patent: Oct. 7, 2025

(54) HINGE STRUCTURE USING ACTUATOR AND FOLDABLE ELECTRONIC DEVICE COMPRISING SAME

(71) Applicant: Samsung Electronics Co., Ltd., Gyeonggi-do (KR)

(72) Inventors: Jaehee Kim, Gyeonggi-do (KR); Daehyeong Park, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 381 days.

(21) Appl. No.: 18/134,677

(22) Filed: Apr. 14, 2023

(65) Prior Publication Data

US 2023/0254390 A1     Aug. 10, 2023

Related U.S. Application Data

(63) Continuation of application No. PCT/KR2021/016880, filed on Nov. 17, 2021.

(30) Foreign Application Priority Data

Jan. 12, 2021   (KR) ........................ 10-2021-0004250

(51) Int. Cl.
*H04M 1/02*     (2006.01)
*G06F 1/16*     (2006.01)

(52) U.S. Cl.
CPC .......... *H04M 1/022* (2013.01); *G06F 1/1681* (2013.01); *H04M 1/0268* (2013.01)

(58) Field of Classification Search
CPC .. G06F 1/1681; G06F 1/1652; H04M 1/0216; H04M 1/022; H04M 1/0266; H04M 1/0268

See application file for complete search history.

(56) References Cited

U.S. PATENT DOCUMENTS 10,401,917 B1    9/2019   Dai et al.
10,551,880 B1    2/2020   Ai et al.
(Continued)

FOREIGN PATENT DOCUMENTS

CN      205190517 U    4/2016
CN      111835895 A    10/2020
(Continued)

OTHER PUBLICATIONS

Korean Office Action dated Jan. 8, 2025.
International Search Report dated Mar. 4, 2022.

*Primary Examiner* — Patrick F Marinelli
(74) *Attorney, Agent, or Firm* — Cha & Reiter, LLC.

(57) ABSTRACT

According to certain embodiments, a foldable electronic device comprises: a first housing; a second housing; a display, wherein at least a portion of the display is positioned on the first housing and at least another portion of the display is disposed on the second housing; and a hinge structure coupling the first housing and the second housing; and wherein the hinge structure includes: a first rotary member coupled to the first housing; a second rotary member coupled to the second housing; a first arm part at least partially inserted onto a first rotary shaft; a second arm part at least partially inserted onto a second rotary shaft; a first link coupling the first rotary member and the first arm part; a second link coupling the second rotary member and the second arm part; a first actuator coupled to the first link and configured to provide rotational force; and a second actuator coupled to the second link and configured to provide rotational force.

20 Claims, 13 Drawing Sheets

(56) References Cited

U.S. PATENT DOCUMENTS

| | | | |
|---|---|---|---|
| 10,609,192 B1 | 3/2020 | Kumar Agrawal et al. | |
| 10,754,395 B2 | 8/2020 | Sanchez et al. | |
| 10,761,574 B1* | 9/2020 | Hsu | G06F 1/1616 |
| 10,824,197 B1* | 11/2020 | Hsu | G06F 1/1641 |
| 10,827,633 B2 | 11/2020 | Yoo et al. | |
| 10,845,850 B1* | 11/2020 | Kang | H04M 1/0268 |
| 10,856,430 B2 | 12/2020 | Yoo et al. | |
| 11,032,929 B2 | 6/2021 | Yoo et al. | |
| 11,086,356 B2 | 8/2021 | Hou et al. | |
| 11,228,671 B2 | 1/2022 | Kumar Agrawal et al. | |
| 11,231,754 B2* | 1/2022 | Kang | H04M 1/022 |
| 11,385,686 B2 | 7/2022 | Ai et al. | |
| 11,392,169 B2 | 7/2022 | Wu et al. | |
| 11,392,178 B2 | 7/2022 | Chuang et al. | |
| 11,576,272 B2 | 2/2023 | Yoo et al. | |
| 11,662,781 B2* | 5/2023 | Kang | H04M 1/022 |
| | | | 361/679.01 |
| 11,681,335 B1* | 6/2023 | Hsu | G06F 1/1681 |
| | | | 361/679.01 |
| 11,843,710 B2* | 12/2023 | Huang | H04M 1/0214 |
| 11,846,997 B2* | 12/2023 | Liao | H04M 1/0216 |
| 11,997,807 B2* | 5/2024 | Park | H05K 5/0017 |
| 12,031,570 B2* | 7/2024 | Hsu | G06F 1/1681 |
| 12,072,744 B2* | 8/2024 | Kang | G06F 1/1652 |
| 12,108,551 B2* | 10/2024 | Jung | H04M 1/0243 |
| 12,136,365 B2* | 11/2024 | Park | H04M 1/022 |
| 12,216,508 B2* | 2/2025 | Hwang | H04M 1/022 |
| 12,221,998 B2* | 2/2025 | Hsu | F16C 11/04 |
| 12,235,687 B2* | 2/2025 | Siddiqui | G06F 1/1618 |
| 12,267,446 B2* | 4/2025 | Kang | F16C 11/04 |
| 2007/0180656 A1 | 8/2007 | Chen et al. | |
| 2020/0103935 A1* | 4/2020 | Hsu | G06F 1/1681 |
| 2020/0166974 A1 | 5/2020 | Ai et al. | |
| 2020/0233466 A1 | 7/2020 | Sanchez et al. | |
| 2020/0272200 A1 | 8/2020 | Hou et al. | |
| 2020/0314226 A1 | 10/2020 | Kumar Agrawal et al. | |
| 2020/0341509 A1 | 10/2020 | Wu et al. | |
| 2020/0348732 A1* | 11/2020 | Kang | G06F 1/1652 |
| 2021/0041921 A1* | 2/2021 | Kang | G06F 1/1616 |
| 2021/0405710 A1 | 12/2021 | Chuang et al. | |
| 2022/0113770 A1* | 4/2022 | Kang | G06F 1/1681 |
| 2022/0342458 A1 | 10/2022 | Ai et al. | |
| 2022/0407950 A1* | 12/2022 | Huang | H04M 1/0268 |
| 2023/0102766 A1* | 3/2023 | Huang | H04M 1/022 |
| | | | 455/575.3 |
| 2023/0216941 A1* | 7/2023 | Park | H04M 1/022 |
| | | | 455/575.3 |
| 2023/0251692 A1* | 8/2023 | Kang | E05D 3/122 |
| | | | 361/679.01 |
| 2023/0254390 A1* | 8/2023 | Kim | H04M 1/022 |
| | | | 455/566 |
| 2023/0319173 A1* | 10/2023 | Huang | G06F 1/1652 |
| | | | 455/566 |
| 2023/0421673 A1* | 12/2023 | Huang | G06F 1/1681 |
| 2024/0036607 A1* | 2/2024 | Yen | G06F 1/1681 |
| 2024/0056517 A1* | 2/2024 | Cheng | H04M 1/022 |
| 2024/0175463 A1* | 5/2024 | Hsu | F16C 11/04 |
| 2024/0175464 A1* | 5/2024 | Hsu | F16C 11/04 |
| 2024/0430348 A1* | 12/2024 | Park | F16C 11/045 |

FOREIGN PATENT DOCUMENTS

| | | |
|---|---|---|
| JP | 2007-170655 A | 7/2007 |
| KR | 10-0461016 B1 | 12/2004 |
| KR | 10-2018-0122210 A | 11/2018 |
| KR | 10-2019-0097898 A | 8/2019 |
| KR | 10-2020-0126524 A | 11/2020 |
| KR | 10-2020-0140582 A | 12/2020 |
| KR | 10-2020-0141820 A | 12/2020 |
| WO | 2019/199284 A1 | 10/2019 |

* cited by examiner

HINGE STRUCTURE USING ACTUATOR AND FOLDABLE ELECTRONIC DEVICE COMPRISING SAME

CROSS-REFERENCE TO RELATED APPLICATION

This application is a continuation of International Application No. PCT/KR2021/016880, filed on Nov. 17, 2021, which claims priority to Korean Patent Application No. 10-2021-0004250, filed on Jan. 12, 2021 in the Korean Intellectual Property Office, the disclosure of all are incorporated by reference herein in their entirety.

BACKGROUND

1. Field

Certain embodiments of the disclosure relate to a hinge structure using an actuator and a foldable electronic device thereof.

2. Description of Related Art

A portable electronic device, such as a smartphone, may provide various functions. The various functions can include voice communication, playback of videos, and internet searching, using various kinds of applications. The user may intend to use the above-mentioned functions through a wider screen. However, as the screen becomes larger, portability may deteriorate. Accordingly, a foldable portable electronic device that may increase portability by utilizing a folded structure has been developed.

In a foldable electronic device, a hinge structure may be connected to adjacent housings and a display positioned on the housings is folded or unfolded (or opened). Accordingly, a wider screen may be provided when the foldable electronic device is unfolded. In this process, a free-stop function may be provided such that the foldable electronic device is held at a specific angle less than 180 degrees. Accordingly, a foldable electronic device may employ a cam structure, and an elastic member to generate a frictional force for the cam operation.

The above-described foldable electronic device may generate friction with a related structure while performing a cam operation. This can produce dust. Furthermore, because of wear due to the cam operation, the smoothness of the cam operation may deteriorate as time elapses. Additionally, the holding angle in the free-stop state may be restricted.

Certain embodiments provide a hinge structure using an actuator, by which a hinge operation is performed. The hinge operation is performed by controlling folding or unfolding of a foldable electronic device by using the actuator. Certain embodiments include a foldable electronic device including the same.

SUMMARY

According to certain embodiments, a foldable electronic device comprises: a first housing; a second housing; a display, wherein at least a portion of the display is positioned on the first housing and at least another portion of the display is disposed on the second housing; and a hinge structure coupling the first housing and the second housing; and wherein the hinge structure includes: a first rotary member coupled to the first housing; a second rotary member coupled to the second housing; a first arm part at least partially inserted onto a first rotary shaft; a second arm part at least partially inserted onto a second rotary shaft; a first link coupling the first rotary member and the first arm part; a second link coupling the second rotary member and the second arm part; a first actuator coupled to the first link and configured to provide rotational force; and a second actuator coupled to the second link and configured to provide rotational force.

According to certain embodiments, a hinge structure comprises: a first rotary member at least partially disposed in a fixing bracket; a second rotary member at least partially disposed in the fixing bracket; a first arm part adjacent to the first rotary member, and at least a portion of which is inserted onto a first rotary shaft; a second arm part adjacent to the second rotary member, and at least a portion of which is inserted onto a second rotary shaft; a first link connecting the first rotary member and the first arm part; a second link connecting the second rotary member and the second arm part; a first actuator connected to the first link and configured to provide a rotational force; and a second actuator connected to the second link and configured to provide a rotational force.

DETAILED DESCRIPTION

Figure 1A:
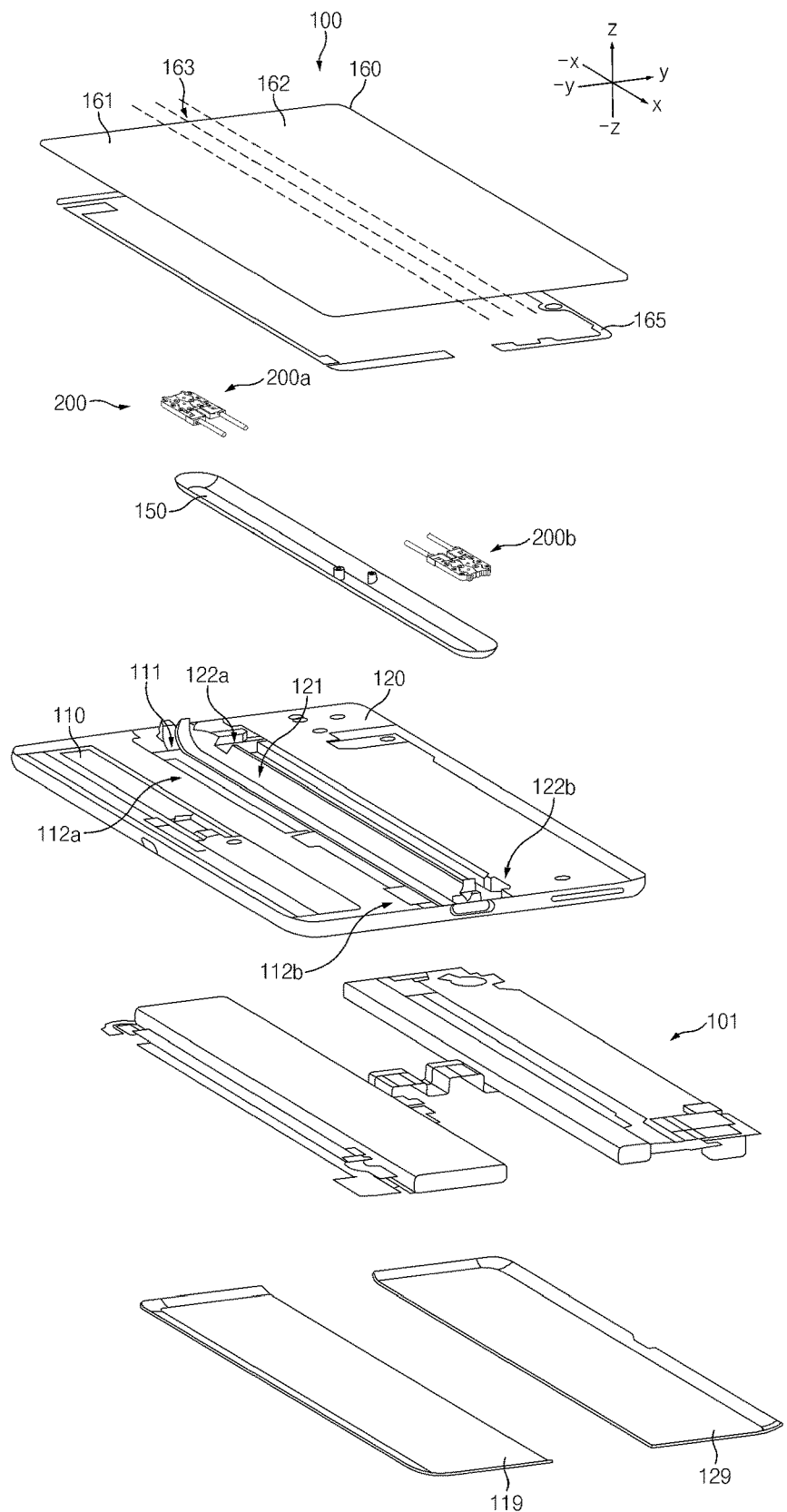
FIG. 1A is a view illustrating an exploded perspective view of a foldable electronic device according to certain embodiments.

According to an embodiment, a foldable electronic device may be easily changed from a folded state to an unfolded state, and vice versa through manipulation.

Furthermore, certain embodiments may provide allows the foldable electronic device to have holding states with various different angles.

Other various purposes and effects provided by the foldable electronic device according to certain embodiments may be mentioned according to the embodiments of the detailed description.

Hereinafter, certain embodiments of the disclosure will be described with reference to the accompanying drawings. Accordingly, those of ordinary skill in the art will recognize that various modifications, use of equivalent(s), and/or alternatives can be made without departing from the scope and spirit of the disclosure. With regard to the description of drawings, similar components may be denoted by similar reference numerals.

In the disclosure, the expressions "have", "may have", "include" and "comprise", or "may include" and "may comprise" used herein indicate existence of corresponding features (e.g., elements such as numeric values, functions, operations, or components) but do not exclude presence of additional features.

In the disclosure, the expressions "A or B", "at least one of A or/and B", or "one or more of A or/and B", and the like used herein may include any and all combinations of one or more of the associated listed items. For example, the term "A or B", "at least one of A and B", or "at least one of A or B" may refer to all of the following cases: case (1) where at least one A is included, the case (2) where at least one B is included, or the case (3) where both of at least one A and at least one B are included.

The terms, such as "first", "second", and the like used herein may refer to various elements of the disclosure, but do not limit the elements. For example, such terms are used only to distinguish an element from another element and do not limit the order and/or priority of the elements. For example, a first user device and a second user device may represent different user devices regardless of sequence or importance. For example, without departing the scope of the disclosure, a first element may be referred to as a second element, and similarly, a second element may be referred to as a first element.

The term "parallel" shall be understood to mean "substantially parallel" or within 3 degrees of parallel. The term "orthogonal" shall be understood to mean "substantially orthogonal" or within 3 degrees of orthogonal.

It will be understood that when an element (e.g., a first element) is referred to as being "(operatively or communicatively) coupled with/to" or "connected to" another element (e.g., a second element), it can be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there are no intervening element (e.g., a third element).

According to the situation, the expression "configured to" used herein may be used as, for example, the expression "suitable for", "having the capacity to", "designed to", "adapted to", "made to", or "capable of". The term "configured to (or set to)" is not limited to "specifically designed to" in hardware. Instead, the expression "a device configured to" may mean that the device is "capable of" operating together with another device or other components. CPU, for example, a "processor configured to perform A, B, and C" may mean a dedicated processor (e.g., an embedded processor) for performing a corresponding operation or a generic-purpose processor (e.g., a central processing unit (CPU) or an application processor) which may perform corresponding operations by executing one or more software programs which are stored in a memory device.

Terms used in this specification are used to describe specified embodiments of the disclosure and are not intended to limit the scope of the disclosure. The terms of a singular form may include plural forms unless otherwise specified. Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal detect unless expressly so defined herein in certain embodiments of the disclosure. According to occasions, even a term defined in the disclosure cannot be construed to exclude the embodiments of the disclosure.

A foldable electronic device or an electronic device according to certain embodiments of the disclosure may include at least one of smartphones, tablet personal computers (PCs), mobile phones, video telephones, electronic book readers, desktop PCs, laptop PCs, netbook computers, workstations, servers, personal digital assistants (PDAs), portable multimedia players (PMPs), MP3 players, mobile medical devices, cameras, and wearable devices. According to certain embodiments of the disclosure, the wearable devices may include accessories (e.g., watches, rings, bracelets, ankle bracelets, glasses, contact lenses, or head-mounted devices (HMDs)), cloth-integrated types (e.g., electronic clothes), body-attached types (e.g., skin pads or tattoos), or implantable types (e.g., implantable circuits).

Hereinafter, electronic devices according to an embodiment of the disclosure will be described with reference to the accompanying drawings. The term "user" used herein may refer to a person who uses an electronic device or may refer to a device (e.g., an artificial electronic device) that uses an electronic device.

Figure 1B:
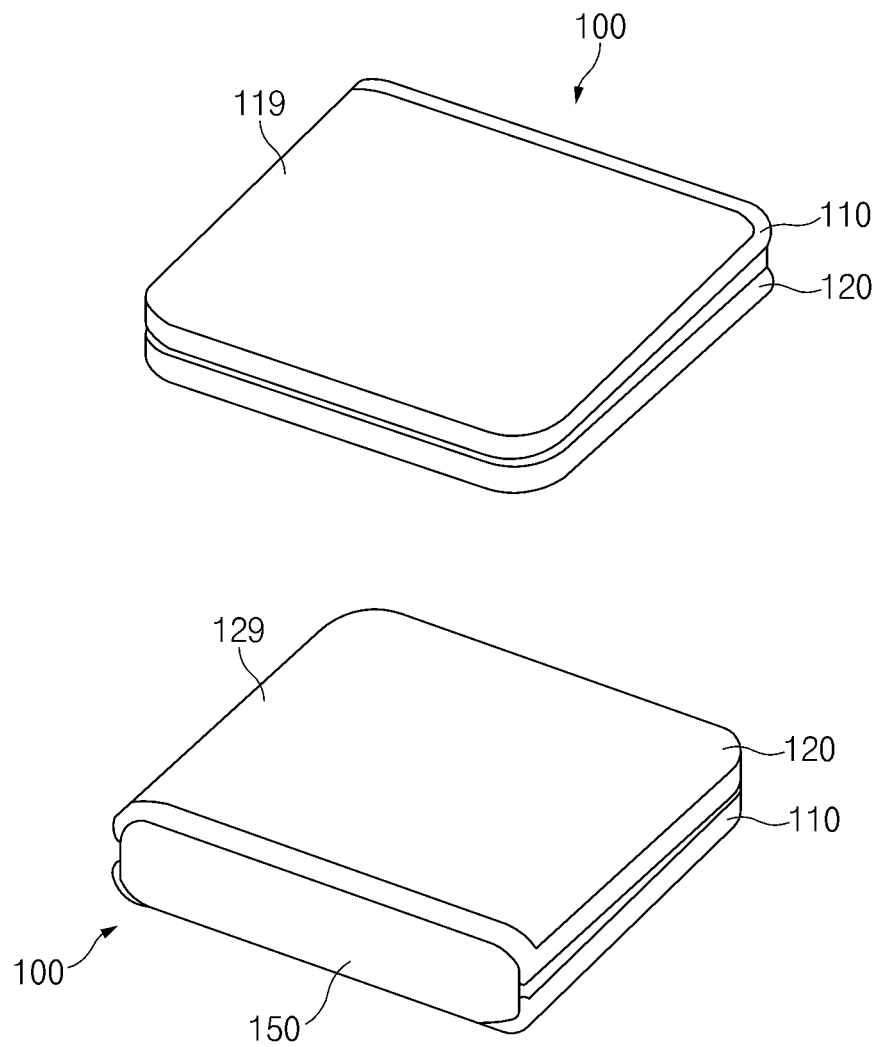
FIG. 1B is a view illustrating an example of an external appearance of a foldable electronic device in a folded state according to certain embodiments.
Figure 1C:
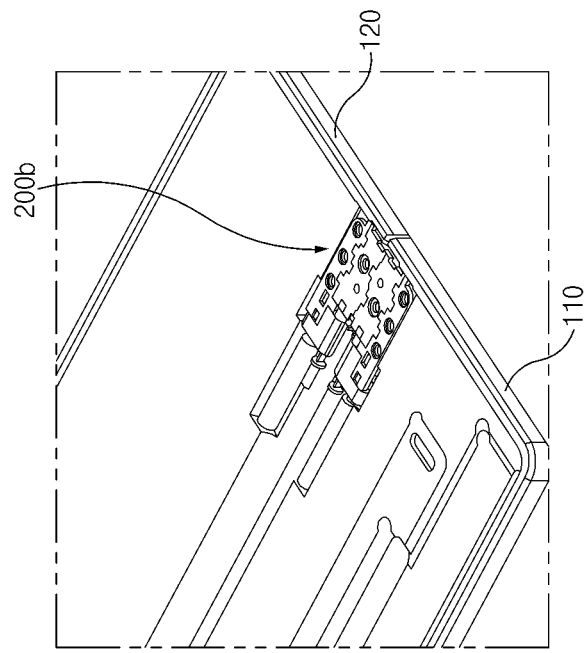
FIG. 1C is a view illustrating some examples of a housing of a foldable electronic device and a hinge structure according to certain embodiments.
Figure 1C:
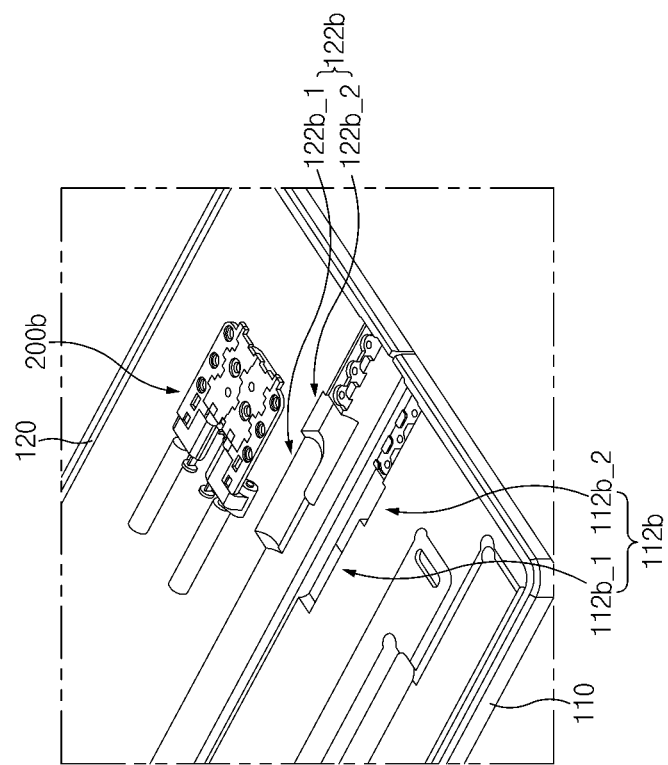
Figure 2A:
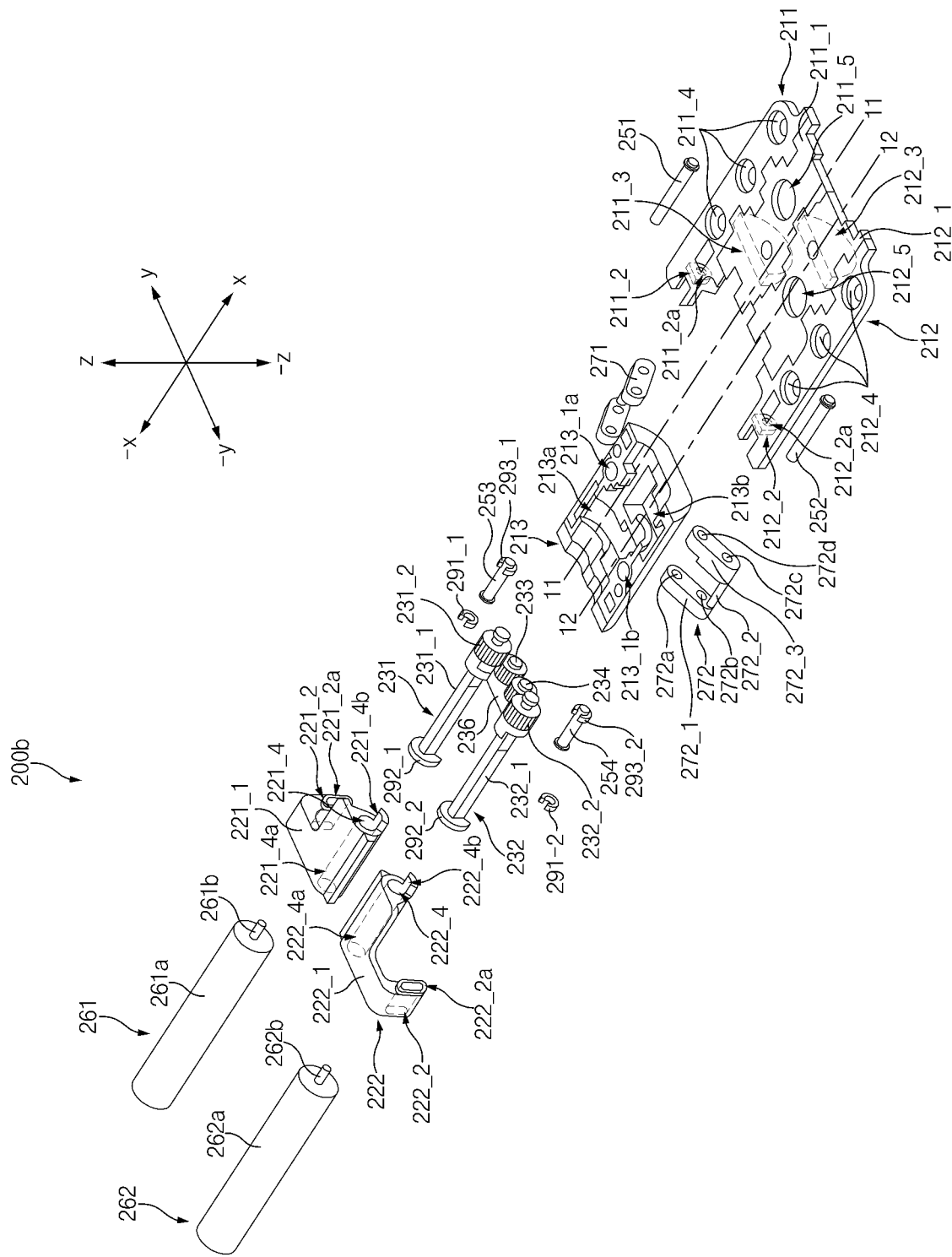
FIG. 2A is a view illustrating an exploded perspective view of a hinge structure of a foldable electronic device in a first direction according to certain embodiments.
Figure 2B:
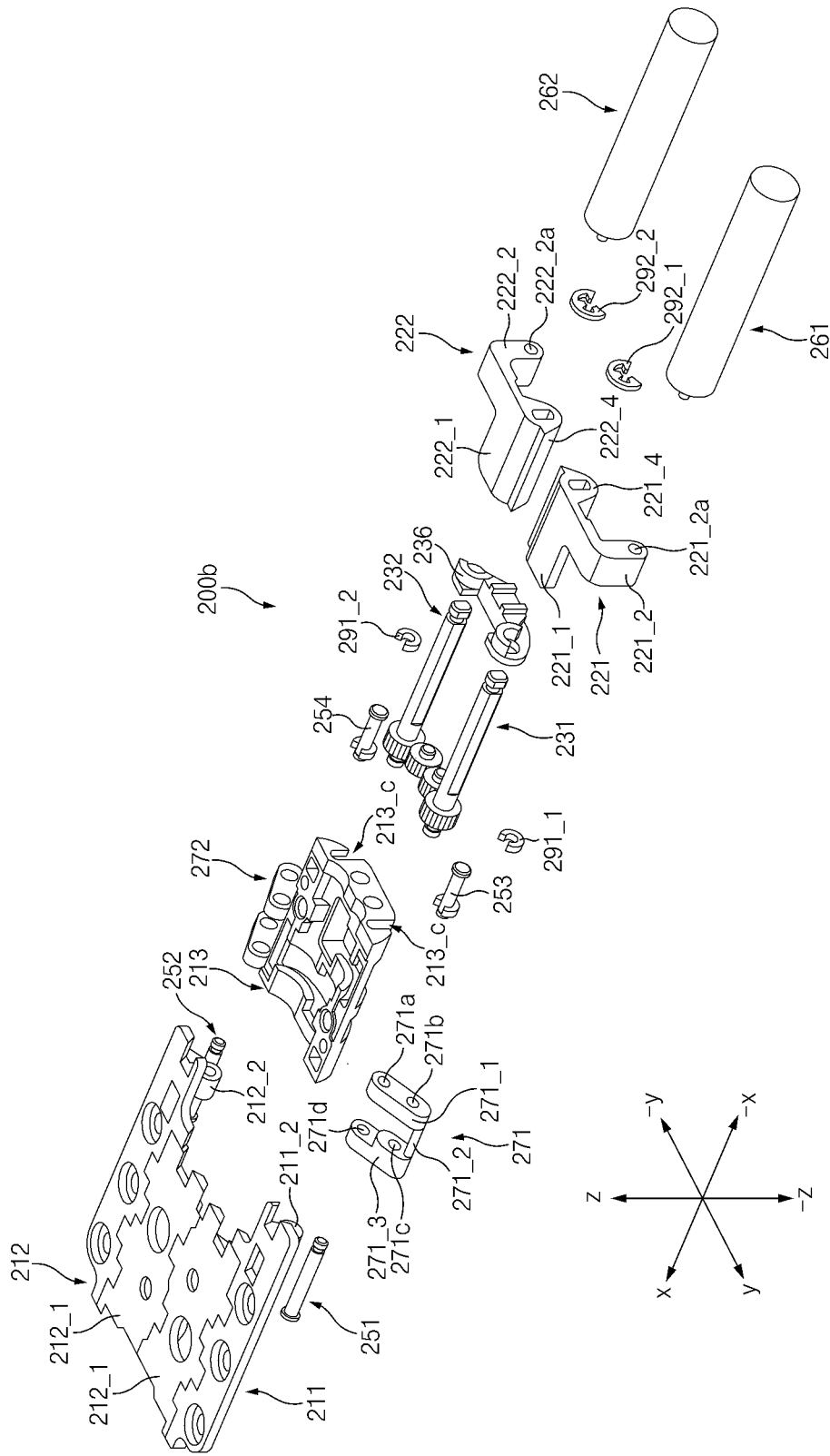
FIG. 2B is a view illustrating an exploded perspective view of a hinge structure of a foldable electronic device in a second direction according to certain embodiments.

FIGS. 1A-1C describe a foldable electronic device 100. The foldable electronic device includes a first housing 110, and a second housing 120 coupled to the first housing 110 by a hinge structure 200. FIGS. 2A-2B describe a hinge structure 200.

FIG. 1A is a view illustrating an exploded perspective view of a foldable electronic device according to certain embodiments. FIG. 1B is a an external view of a foldable electronic device in a folded state according to certain embodiments. FIG. 1C is a housing(s) of the foldable electronic device and a hinge structure according to certain embodiments.

In FIG. 1A, a foldable electronic device 100 can include a first housing 110 and a second housing 120 connected to the first housing 110 by a hinge structure 200. FIG. 1B shows the foldable electronic device 100 in the folded state. In the top illustration, the foldable electronic device 100 is shown from distal ends of the first housing 110 and the second housing 120. In the bottom illustration, the foldable electronic device 100 is shown from the portions of the first housing 110 and second housing 120 that are proximate to each other.

In FIG. 1C, the first housing 110 includes a first seating area 112$b\_1$ and a second seating area 112$b\_2$, while the second housing 120 includes a third seating area 122$b\_1$ and a fourth seating area 122$b\_2$. The hinge structure 200$b$ can be disposed inside the first seating area 112$b\_1$, the second seating area 112$b\_2$, the third seating area 122$b\_1$ and the fourth seating area 122b_2, thereby coupling the first housing 110 and the second housing 120.

Referring to FIGS. 1A and 1C, a foldable electronic device 100 (or an electronic device, a portable electronic device, or a portable foldable electronic device) according to an embodiment may include a first housing 110 and a second housing 120, a display 160 (e.g., a flexible display), a hinge structure 200 (or a hinge structure, a hinge member, a hinge part, or a hinge), a hinge housing 150, inside of which at least a portion of the hinge structure 200 is disposed, various electronic elements 101 (e.g., a battery, a printed circuit board, a camera, at least one sensor, a communication circuit, an antenna, an actuator driving circuit for driving (or driving a motor or driving a power part) at least one actuator disposed in the hinge structure 200, or a wiring line between the actuator driving circuit and the actuator) related to driving of the foldable electronic device 100, a first cover 119 covering at least a portion of one surface (e.g., a surface that faces the −z axis direction) of the first housing 110, and a second cover 129 covering at least a portion of one surface of the second housing 120. FIG. 1A illustrates an exploded perspective view of the foldable electronic device 100 in a first state (e.g., a flat state, a unfolding state, an unfolded state, or an opened state). FIG. 1B is a perspective view of the foldable electronic device 100 in a second state (e.g., a folded state, a folding state, or a closed state). FIG. 1C is a view illustrating housings and a hinge structure of the foldable electronic device 100 in the first state.

The first housing 110 may be continuous to the second housing 120 in the y axis direction or may be parallel to the second housing 120 in the z axis direction. Furthermore, when at least a portion of a central part 163 of the display 160 is folded, one surface (e.g., a surface that faces the z axis direction in FIG. 1A) of the first housing 110 may face one surface (a surface that faces the z axis direction in FIG. 1A) of the second housing 120.

The first housing 110 may be formed of a material having a specific strength to support at least a portion of the display 160. For example, at least a portion of the first housing 110 may be formed of a metallic material or at least a portion thereof is formed of a nonmetallic material. An area (an area (e.g., a first part 161 and a portion of the central part 163) of the display 160) of the display 160 may be disposed on at least a portion of a front surface of the first housing 110. At least a portion of the first housing 110 may be bonded to an area (e.g., at least a portion of the first part 161 and the portion of the central part 163) of the display 160. The bonding may be through a bonding means, a bonding member, or a bonding tape.

Furthermore, at least a portion of a periphery of a front surface of the first housing 110 may be bonded to at least a portion of a periphery of an area (e.g., the first part 161 and the portion of the central part 163) of the display 160. Furthermore, one side of an upper portion of the front surface of the first housing 110 may be bonded to one side of the first part 161 of the display 160. In this regard, at least a portion of a bonding layer 165 (or a bonding means, a bonding member, or a bonding tape) may be disposed at least a portion between the first housing 110 and the first part 161 of the display 160. At least a portion of an inside of the first housing 110 may be hollow while being coupled to the first cover 119. The electronic elements 101 (e.g., elements, such as a printed circuit board, at least one processor mounted on the printed circuit board, at least one memory, or a battery) that are necessary for driving the display 160 may be disposed inside of the first housing 110.

Peripheral ends of the first housing 110 may protrude by a specific height further than a bottom surface of a central part of the housing to surround a periphery of at least one side of the display 160. Furthermore, side walls, at least portions of which face a periphery of the display 160, may be disposed at least a portion of the periphery end of the first housing 110. Side walls formed at least a portion of a periphery of the first housing 110 may have specific heights at the remaining three peripheries, except for the periphery that faces the second housing 120. A periphery portion of the first housing 110, which faces the second housing 120, may include a recessed part 111, at least a portion of which has a specific curvature such that least a portion of the hinge housing 150 is disposed.

The first housing 110 may include seating parts 112a and 112b at a peripheral part that faces the second housing 120. A portion of the hinge structure 200 may be seated in the seating parts 112a and 112b. The first housing 110, for example, may include the first seating part 112a, on which at least a portion of a first hinge structure 200a is seated, and the second seating part 112b, on which at least a portion of an actuator of a second hinge structure 200b is seated. According to an embodiment, the second seating part 112b may include a first seating area 112b_1 (a recess, a hole, or an opening), on which at least a portion of the first actuator of the second hinge structure 200b is seated, and a second seating area 112b_2 (a recess, a hole, or an opening) (or an empty space area, in which at least a portion of a first link of the second hinge structure 200b is disposed), on which at least a portion of the first link (or a support member or a connecting member) connected to the first actuator of the second hinge structure 200b is seated. According to certain embodiments, the first seating part 112a of the first housing 110 may have a structure that is symmetrical to the second seating part 112b with respect to the y axis, and may include seating areas, which are disposed at a periphery on an opposite side of a location, at which the second seating part 112b is disposed, and on which the actuator and the link on one side of the first hinge structure 200a may be seated.

As described above, the first housing 110 may provide a space, of which a z axis height is larger (or higher) than that of the hinge housing 150, and an actuator that is larger than an actuator that may be mounted on the hinge housing 150 may be mounted as first actuators of the first hinge structure 200a and the second hinge structure 200b. Accordingly, the first actuator may provide a higher torque in relation to hinge operations of the first housing 110 and the second housing 120, than the actuator that may be mounted on the hinge housing 150.

According to certain embodiments, the second housing 120, according to disposition thereof, may be disposed in parallel to the first housing 110 or may be disposed such that least one surface thereof faces one surface (e.g., a surface on which the display 160 is disposed) of the first housing 110. The second housing 120 may be formed of the same material as the first housing 110. Because the second housing 120 is disposed to be symmetrical to the first housing 110 leftwards and rightwards or upwards and downwards, at least a portion (e.g., a second part 162 of the display 160 and an opposite side of the central part 163) of the remaining area of the display 160, except for the area disposed in the first housing 110, may be disposed to be supported by a front surface of the second housing 120. At least a portion of the second housing 120 may be bonded to at least a portion of the second part 162 and the opposite side of the central part 163 of the display 160. Furthermore, a periphery of the front surface of the second housing 120 may be bonded to at least a portion of the second part 162 and the opposite side of the central part 163 of the display 160. Furthermore, one side of a lower portion of a front surface (e.g., a surface that faces the z axis direction in FIG. 1A) of the second housing 120 may be bonded to one side of the second part 162 of the display 160. In this regard, at least a portion of the bonding layer 165 (or a bonding means, a bonding member, or a bonding tape) may be disposed at least a portion between the second housing 120 and the second part 162 of the display 160. At least a portion of the inside of the second housing 120 may be configured such that the interior thereof is empty similarly to the first housing 110 or may be configured such that the interior thereof is empty after the second housing 120 is coupled to the second cover 129 so that electronic elements 101 that are necessary for driving the display 160 may be disposed.

According to certain embodiments, peripheral ends (e.g., peripheral ends of the remaining three sites, except for a periphery that faces the first housing 110) of the second housing 120 may protrude by a specific height further than a bottom surface of a central part of the second housing 120 to surround a periphery of an opposite side of the display 160. Furthermore, similarly to the side walls formed in the first housing 110, side walls, at least portions of which face the periphery of the display 160, may be disposed at least a portion of the peripheral end of the second housing 120. Side walls formed at least a portion of a periphery of the second housing 120 may have specific heights at the remaining three peripheries, except for the periphery that faces the first housing 110.

A portion of the second housing 120, which faces the first housing 110, may include a recessed part 121, at least a portion of which has a specific curvature such that the hinge housing 150 is disposed. According to an embodiment, the second housing 120 may include a third seating part 122a and a fourth seating part 122b, on which a portion of the hinge structure 200 mounted on the hinge housing 150 is seated, at a peripheral part that faces the first housing 110. According to an embodiment, the fourth seating part 122b may include a third seating area 122b_1, on which at least a portion of the second actuator of the second hinge structure 200b is seated, and a fourth seating area 122b_2 (or an empty space area, in which at least a portion of the second link of the second hinge structure 200b is disposed), on which at least a portion of the second link (or a support member or a connecting member) connected to the second actuator of the second hinge structure 200b is seated. According to certain embodiments, at a periphery of the third seating part 122a of the second housing 120, which is opposite to a periphery at a location, at which the fourth seating part 122b is disposed, with respect to the y axis, the same structure (or a structure that is symmetrical with respect to the y axis) as that of the fourth seating part 122b may be formed, and the third seating part 122a of the second housing 120 may include a structure, on which a portion of the actuator of the first hinge structure 200a and at least a portion of the link are seated. As described above, the second housing 120 may provide a space, of which a z axis height is larger (or higher) than that of the hinge housing 150, and an actuator that is larger than an actuator that may be mounted on the hinge housing 150 may be mounted as second actuators of the first hinge structure 200a and the second hinge structure 200b. Accordingly, the second actuator may provide a higher torque in relation to hinge operations of the first housing 110 and the second housing 120, than the actuator that may be mounted on the hinge housing 150.

According to certain embodiments, the foldable electronic device 100 may include at least one sensor disposed on one side of the first housing 110 or the second housing 120 and related to management of a specific function of the foldable electronic device 100. The sensor, for example, may include at least one of a proximity sensor, an illumination sensor, an iris sensor, an image sensor (or a camera), or a fingerprint sensor.

According to certain embodiments, the hinge housing 150 may be covered by one side of the first housing 110 or the second housing 120 (e.g., an unfolded state of the first housing 110 and the second housing 120) or be exposed to the outside (e.g., a folded state of the first housing 110 and the second housing 120) according to the folded or unfolded state of the foldable electronic device 100. For example, as in FIG. 1A, when the first housing 110 and the second housing 120 are disposed parallel to each other, the hinge housing 150 may be covered by the first housing 110 and the second housing 120. As in FIG. 1B, when one surface of the first housing 110 and one surface of the second housing 120 are disposed to face each other, the hinge housing 150 may be disposed such that least a portion thereof is exposed to the outside at peripheries (e.g., peripheries of the first housing 110 and the second housing 120, which face each other in the unfolded state) of one side of the first housing 110 and the second housing 120.

According to certain embodiments, at least a portion of the display 160 may be flexible. According to an embodiment, the display 160 may include the first part 161 disposed on the first housing 110, the second part 162 disposed on the second housing 120, and the central part 163 or a central area that are adjacent to the first housing 110 and the second housing 120. According to certain embodiments, the entire display 160 may be flexible. The central part 163 of the display 160 may be disposed not to be bonded to the first housing 110 and the second housing 120. For example, the central part 163 of the display 160 may be spaced apart from front surfaces (e.g., surfaces that face the z axis direction in FIG. 1A) of the first housing 110 and the second housing 120 by a specific interval. Furthermore, a specific gap may be formed between the central part 163 of the display 160 and the first housing 110 and the second housing 120. The first part 161 of the display 160 may be bonded to at least a portion of the first housing 110, and the second part 162 of the display 160 may be bonded to at least a portion of the second housing 120. In this regard, a portion of the bonding layer 165 may be disposed in at least a partial area between the display 160 and the first housing 110, and another portion of the bonding layer 165 may be disposed in at least a partial area between the display 160 and the second housing 120. According to certain embodiments, the bonding layer 165, as illustrated, may be disposed only at the peripheries of the first housing 110 and the second housing 120.

According to certain embodiments, the hinge structure 200 may include the first hinge structure 200a, at least a portion of which is disposed on one side (e.g., a −x axis periphery) of the hinge housing 150, and the second hinge structure 200b, at least a portion of which is disposed on an opposite side (e.g., a x axis periphery) of the hinge housing 150. The first hinge structure 200a and the second hinge structure 200b may include the same structure and the same configuration, and may be disposed to be symmetrical to each other leftwards and rightward with respect to the y axis. Although it is exemplified in the illustrated drawings that two hinge structures (e.g., the first hinge structure 200a and the second hinge structure 200b) are disposed, certain embodiments of the disclosure are not limited thereto. For example, at least portions of the two or more hinge structures may be received or disposed in the hinge housing 150. According to certain embodiments, at least one of the first hinge structure 200a and the second hinge structure 200b may include an actuator related to a hinge operation. Correspondingly, the foldable electronic device 100 may include an actuator driving circuit related to driving of the actuator, a wiring line between the actuator driving circuit and the actuator, and a battery for supplying electric power to the actuator and the actuator driving circuit. The actuator driving circuit may be implemented as a part of the processor, or may be controlled by the processor after being provided as a separate configuration.

According to certain embodiments, the foldable electronic device 100 may further include a physical button for triggering driving of the actuator. According to an embodiment, the foldable electronic device 100 may include a first physical button for a folding operation, and a second physical button for an unfolding operation. According to certain embodiments, the first cover 119 or the second cover 129 of the foldable electronic device 100 may be implemented as a touch screen (or an auxiliary display). The foldable electronic device 100 may output at least one icon or menu related to adjustment (e.g., adjustment of a fully unfolding operation, in which an angle between the first housing 110 and the second housing 120 is 180 degrees or an angle that is close to 180 degrees, or adjustment of a free stop operation for holding at a specific angle between the first housing 110 and the second housing 120, which is smaller than 180 degrees and larger than 0 degrees) of a folding operation or an unfolding operation, through the touch screen. According to certain embodiments, an auxiliary display that is disposed at least one site of an outer side of the first housing 110 or an outer side of the second housing 120 may be further included. The foldable electronic device 100 may include at least one processor for controlling the auxiliary display, and the processor may be configured to output a screen interface for controlling the first actuator or the second actuator on the auxiliary display in correspondence to a user input. According to certain embodiments, the display 160 may output the screen interface related to the first actuator or the second actuator. According to certain embodiments, the foldable electronic device 100 may further include a processor, and the processor may be configured to output a screen interface related to control of the first actuator and the second actuator in correspondence to execution of a specific application. Alternatively, the processor may be configured to change the folded state to the unfolded state by automatically controlling the first actuator and the second actuator in correspondence to execution of the specific application. Alternatively, the processor may be configured to change the unfolded state to the folded state by automatically controlling the first actuator and the second actuator in correspondence to execution of the specific application. According to certain embodiments, the foldable electronic device 100 may output at least one icon or menu related to adjustment of the unfolded state to the folded state, or adjustment of a free stop operation for holding at a specific angle that is smaller than 180 degrees, through the display 160.

The above-described foldable electronic device 100 may not include various configurations that are necessary for a cam operation, for example, a cam structure and elastic members, because the hinge structure performs a hinge operation through driving of the actuator while not performing a cam operation. According to certain embodiments, a magnet member related to maintenance of the folded state of the foldable electronic device 100 may be disposed on one side of the first housing 110 or the second housing 120, for example, at a −y axis or y axis periphery thereof, and the magnet member may not be included as the actuator of the hinge structure 200 is applied.

The hinge structure 200 will now be described in more detail. The hinge structure 200 can include actuators 261, 262, arm parts 221, 222, rotary shafts 231, 232, links 271, 272, and rotary members 211, 212. The actuator 261 includes an actuator shaft 261b that drives the links 271, 272. The actuator shaft 261b may be inserted into a hole 271_1 in the link. The rotary shafts 231, 232 are at least partially inserted into the arm parts 221, 222.

Figure 3:
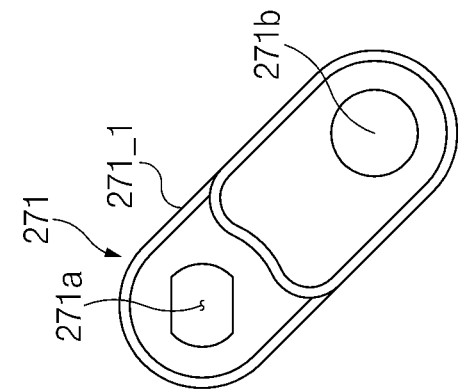
FIG. 3 is a view illustrating an example of an actuator and a link according to certain embodiments.
Figure 3:
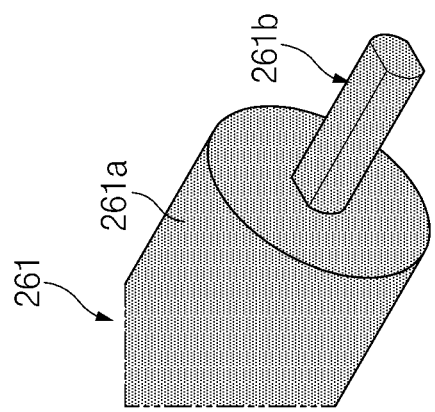
Figure 3:
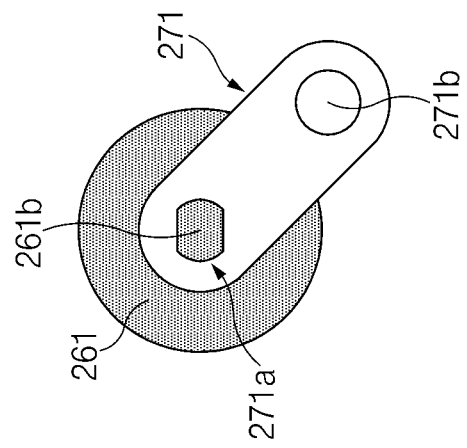
Figure 4:
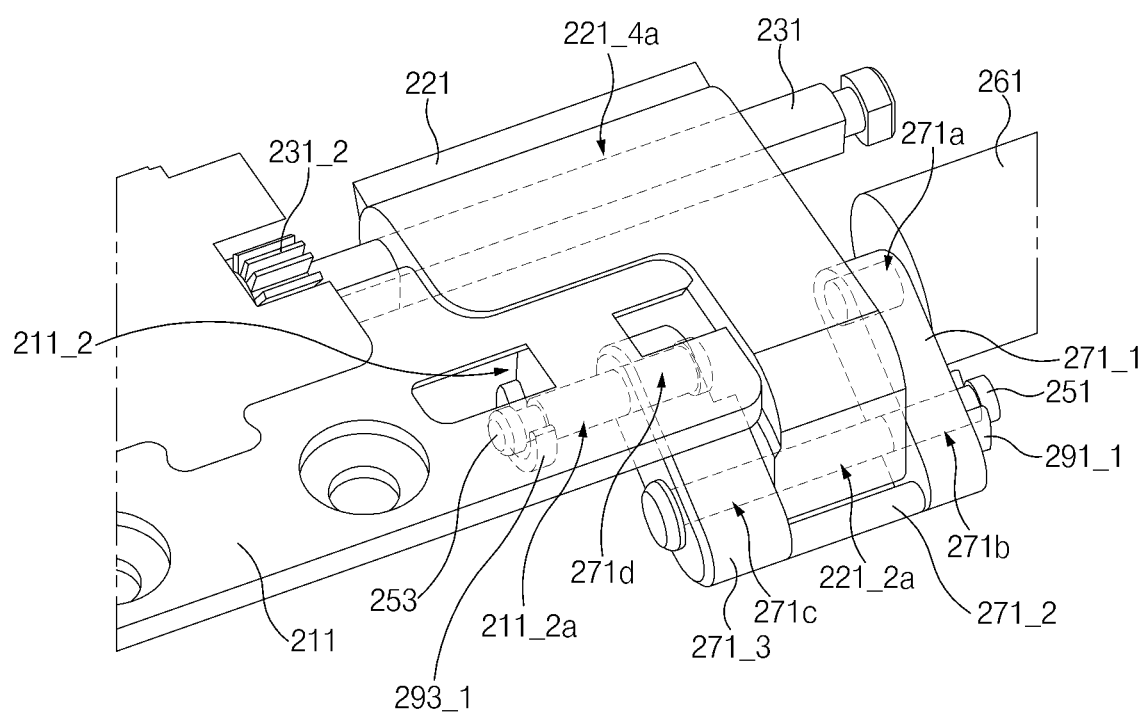
FIG. 4 is a view illustrating an example of a coupled state of a link and a peripheral structure according to certain embodiments.

FIG. 2A is a view illustrating an exploded perspective view of the hinge structure of the foldable electronic device in a first direction according to certain embodiments. FIG. 2B is a view illustrating an exploded perspective view of the hinge structure of the foldable electronic device in a second direction according to certain embodiments. FIG. 3 is a view illustrating an example of an actuator and a link according to certain embodiments. FIG. 4 is a view illustrating an example of a coupled state of a link and a peripheral structure according to certain embodiments.

In the following description, among the hinge structures 200a and 200b, the second hinge structure 200b will be described as an example. A structure and a configuration of the second hinge structure 200b described in FIGS. 2A and 2B may be the same as those of the first hinge structure 200a described above. According to certain embodiments, the first hinge structure 200a and the second hinge structure 200b may have different structures. For example, the first hinge structure 200a may employ a structure including a cam structure and an elastic member while a separate actuator structure is not applied.

The second hinge structure 200b may include a fixing bracket 213, a first rotary member 211, a second rotary member 212, a first fixing part 251, a second fixing part 252, a first arm part 221, a second arm part 222, a first link 271, a second link 272, a third fixing part 253, a fourth fixing part 254, a first actuator 261, a second actuator 262, a first rotary shaft 231, a second rotary shaft 232, a stopper 236, a first idle gear 233, a second idle gear 234, and a plurality of fixing clips 291_1, 291_2, 292_1, 292_2, 293_1, and 293_2. At least some of the above-described configurations of the second hinge structure 200b may be formed of a metallic material to have a specific strength. Alternatively, at least a portion of the second hinge structure 200b may have a material such as a reinforced plastic or a resin.

At least a portion of a shape of a lower surface (e.g., a surface in the −z axis direction) of the fixing bracket 213 may include a curved surface. For example, the lower surface of the fixing bracket 213 may be formed to correspond to an inner shape of the hinge housing 150, of which a z axis cross-section at least partially includes a curve. At least a portion of the upper surface (e.g., a surface in the z axis direction) of the fixing bracket 213 may have a flat shape, and rail grooves 213a and 213b may be formed such that the rotary members 211 and 212 are coupled thereto.

According to an embodiment, the fixing bracket 213 may include the first rail groove 213a, of which at least a portion of a cross-section is arc-shaped from an upper surface (e.g., a surface in the z axis direction) thereof toward a lower surface (e.g., a surface in the −z axis direction), and into which a first rail 211-3 of the first rotary member 211 is inserted from the first direction (e.g., the y axis direction) to the second direction (e.g., the −y axis direction). According to an embodiment, the fixing bracket 213 may include a second rail groove 213b, of which at least a portion of a cross-section is arc-shaped from an upper surface (e.g., a surface in the z axis direction) thereof toward a lower surface (e.g., a surface in the −z axis direction), and into which a second rail 212-3 of the second rotary member 212 is inserted from the second direction (e.g., the −y axis direction) to the first direction (e.g., the y axis direction).

The first rail groove 213a may be disposed to be biased to the y axis direction as compared with the second rail groove 213b, and the second rail groove 213b may be disposed to be biased to the −y axis direction as compared with the first rail groove 213a. The first rail groove 213a may be rotated about a first imaginary axis (or first axis) 11, and the second rail groove 213b may be rotated about a second imaginary axis (or second axis) 12. The first imaginary axis 11 and the second imaginary axis 12 may be formed on an upper side of an upper surface (e.g., a surface in the z axis direction) of the fixing bracket 213, and the first imaginary axis 11 and the second imaginary axis 12 may be spaced apart from each other by a specific interval. According to an embodiment, the first axis (e.g., the first imaginary axis 11), about which the first rotary member 211 is rotated, and the second axis (e.g., the second imaginary axis 12), about which the second rotary member 212 is rotated, may be formed on an area on an upper side of the first rotary shaft 231 and the second rotary shaft 232 in a direction of the display 160. According to certain embodiments, a distance between the first axis, about which the first rotary member 211 is rotated, and the second axis, about which the second rotary member 212 is rotated, may be shorter than a distance between the first rotary shaft 231 and the second rotary shaft 232. According to an embodiment, the fixing bracket 213 may include at least one holding groove, which is formed at a side thereof disposed in the fourth direction (e.g., the −x axis direction), and in which at least one of one end (e.g., an end in the x axis direction) of the first rotary shaft 231, one end (e.g., an end in the x axis direction) of the second rotary shaft 232, one end of the first idle gear 233, and one end of the second idle gear 234 is held.

According to certain embodiments, the fixing bracket 213 may include a first fixing hole 213_1a and a second fixing hole 213_1b that are used to fix the fixing bracket 213 to the hinge housing 150. In the foldable electronic device 100, the fixing bracket 213 may be fixed to the hinge housing 150 by using a coupling member (e.g., a screw or the like). According to an embodiment, the first fixing hole 213_1a and the second fixing hole 213_1b may be disposed to be symmetrical to each other in a diagonal direction with respect to the x axis from the upper surface (e.g., a surface in the z axis direction) of the fixing bracket 213 to fix the fixing bracket 213 to the hinge housing 150 more firmly and stably.

The first rotary member 211 may include a first bracket body 211_1, a first link connecting part 211_2 formed at an end (e.g., an end in the x axis direction) on one side of the first bracket body 211_1, a first link connecting hole 211_2a that passes through one side of the first link connecting part 211_2 in the x axis direction, a first rail 211_3 formed in the first bracket body 211_1, and a first housing coupling hole 211_4 used for coupling to the first housing 110. Additionally, the first rotary member 211 may further include a first bracket opening hole 211_5 arranged in the first fixing hole 213_1a formed in the fixing bracket 213.

At least a portion of the upper surface (e.g., a surface disposed in the z axis direction) of the first bracket body 211_1 may be formed flat. With reference to the illustrated drawings, the first link connecting part 211_2 may be disposed in a downward direction (e.g., the −z axis direction) at an end of the first bracket body 211_1 in the −x axis direction, and the first rail 211_3 may be disposed on a lower surface (e.g., a surface in the −z axis direction) thereof on one side of the first bracket body 211_1.

The first link connecting part 211_2 may be disposed at an end (e.g., an end in the −x axis direction) on one side of the first bracket body 211_1, and may be disposed on a lower side of the first bracket body 211_1. The first link connecting hole 211_2a may be formed in the first link connecting part 211_2 such that the third fixing part 253 is inserted thereinto. Another portion of the third fixing part 253, which is inserted into the first link connecting hole 211_2a, may be coupled to one side of the first link 271.

The first rail 211_3 may be disposed on one side of the first bracket body 211_1. For example, the first rail 211_3 may be disposed on a lower side of the first bracket body 211_1. The first rail 211_3 may have an arc shape having a specific angle with respect to the x axis. The first rail 211_3 may be inserted into the first rail groove 213a disposed in the fixing bracket 213, and may be rotated along the first rail groove 213a in a specific angle range. According to an embodiment, a rotation range of the first rail 211_3, for example, may be a range of −10 degrees to 100 degrees (or a range of 0 degrees to 90 degrees). The first rail 211_3 may be rotated (e.g., rotated in a clockwise direction or in a counterclockwise direction with respect to the x axis) between the y axis and the z axis with respect to the first imaginary axis 11 formed by the first rail groove 213a.

The first housing coupling hole 211_4 may be formed on one side (e.g., a periphery on one side that faces the y axis direction) of the first bracket body 211_1, and may be formed to pass through a surface in the z axis direction and a surface in the −z axis direction. Although it is exemplified in the illustrated drawings that three first housing coupling holes 211_4 are formed in the first bracket body 211_1, certain embodiments of the disclosure are not limited to the number. According to an embodiment, a coupling member may be coupled to a boss or the like provided in the first housing 110 while at least a portion thereof is coupled to the first housing coupling hole 211_4, and thus the first rotary member 211 may be fixed to the first housing 110.

The second rotary member 212 may include a second bracket body 212_1, a second link connecting part 212_2 formed at an end (e.g., an end in the −x axis direction) on one side of the second bracket body 212_1, a second rail 212_3 formed in the second bracket body 212_1, and a second housing coupling hole 212_4 used for coupling to the second housing 120. Additionally, the second rotary member 212 may further include a second bracket opening hole 211_5 arranged in the second fixing hole 213_1b formed in the fixing bracket 213.

The second bracket body 212_1 may have substantially the same shape as that of the first bracket body 211_1. Accordingly, at least a portion of the upper surface (e.g., a surface disposed in the z axis direction) of the second bracket body 212_1 may be formed flat.

The second link connecting part 212_2 may be disposed at an end (e.g., an end in the −x axis direction) on one side of the second bracket body 212_1. For example, the second link connecting part 212_2 may be disposed on a lower side of the second bracket body 212_1. A second link connecting hole 212_2a that extends in the x axis and −x axis directions may be formed in the second link connecting part 212_2. The second link connecting hole 212_2a may be disposed to be symmetrical to the first link connecting hole 211_2a with respect to an x axis center of the fixing bracket 213. The second link connecting hole 212_2a may have the same shape as that of the first link connecting hole 211_2a. At least a portion of the fourth fixing part 254 may be inserted into the second link connecting hole 212_2a.

The second rail 212_3 may be disposed in the second bracket body 212_1. For example, the second rail 212_3 may be disposed on a lower side of the second bracket body 212_1. The second rail 212_3 may have substantially the same shape as that of the first rail 211_3. The second rail 212_3 may be inserted into the second rail groove 213b. For example, the second rail 212_3 may have an arc shape in a specific angle range with respect to the x axis. The second rail 212_3 may be rotated in a specific angle range with respect to the second imaginary axis 12, for example, 80 degrees to 190 degrees (or 90 degrees to 180 degrees). For example, the second rail 212_3 may be rotated (e.g., rotated in a counterclockwise direction or a clockwise direction about the x axis) in a range between the −y axis and the z axis.

The second housing coupling hole 212_4 may be formed on one side (e.g., a periphery on one side that faces the −y axis direction) of the second bracket body 212_1, and may be formed to pass through a surface in the z axis direction and a surface in the −z axis direction.

The first link 271 may be used to connect the first rotary member 211, the first arm part 221, and the first actuator 261. The first link 271, for example, may have a U shape. The first link 271 may include a first link part 271_1, a second link part 271_2 that extends from one end of the first link part 271_1 in a direction that is perpendicular to the first link part 271_1, and a third link part 271_3 that extends from an end of the second link part 271_2 in parallel to the first link part 271_1. The first link part 271_1 may include a first link hole 271a, to which the first actuator 261 is connected, and a second link hole 271b, into which one side of the first fixing part 251 is inserted. The first link hole 271a may have a shape corresponding to a cross-section of a shaft of the first actuator 261. For example, as illustrated in FIG. 3, the first actuator 261 may include a first roller 261a and a first actuator shaft 261b. At least a portion of the first actuator shaft 261b may include a flat shape and a curved shape (e.g., a D-cut shape). Correspondingly, at least a portion of the first link hole 271a may include a flat area to correspond to the first actuator shaft 261b. Accordingly, when the first actuator shaft 261b is rotated, the first link 271 may be rotated. The third link part 271_3 may include a third link hole 271c, into which an opposite side of the first fixing part 251 is inserted, and a fourth link hole 271d, into which the third fixing part 253 is inserted. With respect to the x axis or −x axis direction, the first link hole 271a may be disposed in parallel to the fourth link hole 271d, and the second link hole 271b may be disposed in parallel to the third link hole 271c. The first link 271 may be rotated as the first actuator 261 is rotated, and the first arm part 221 and the first rotary member 211 connected to the first link 271 may be rotated as the first link 271 is rotated. At least a portion of the first link 271 may be disposed in the first seating part 112a of the first housing 110. According to certain embodiments, the first link 271 may be disposed in the first seating part 112a together with the first actuator 261, and may be rotated in a specific space in the first seating part 112a. The first link 271 may be rotated as the first arm part 221 and the first rotary member 211 are rotated.

The second link 272 may have the same structure and size as those of the first link 271. For example, like the first link 271, the second link 272 may include a fourth link part 272_1, in which fifth and sixth link holes 272a and 272b are formed, a sixth link part 272_3, in which the seventh and eighth link holes 272c and 272d, a fifth link part 272_2 that connects the fourth link part 272_1 and the sixth link part 272_3. The second link 272 may be disposed to be symmetrical to the first link 271 with respect to the x axis. One side of the second link 272 may be connected to the second actuator 262. The second link 272 may be rotated as the second actuator 262 is rotated, and the second arm part 222 and the second rotary member 212 connected to the second link 272 may be rotated as the second link 272 is rotated. At least a portion of the second link 272 may be disposed in the second seating part 122b of the second housing 120. According to certain embodiments, the second link 272 may be disposed in the second seating part 122b together with the second actuator 262, and may be rotated in a specific space in the second seating part 122b. The second link 272 may be rotated as the second arm part 222 and the second rotary member 212 are rotated, and a rotational direction of the second link 272 may be opposite to a rotational direction of the first link 271.

The first fixing part 251 may have a pin shape having a specific length in one direction (e.g., the x axis direction). The first fixing part 251 may be formed to be at least larger than a sum of a length (e.g., the x axis depth) of the second link hole 271b of the first link part 271_1, a length (or an x axis depth) of a first fixing part hole 221_2a formed in a first wing 221_2 of the first arm part 221, and a length of the third link hole 271c of the third link part 271_3. After the first fixing part 251 is inserted into the second link hole 271b, the first fixing part hole 221_2a formed in the first wing 221_2, and the third link hole 271c, at least one of the opposite sides of the first fixing part 251 may be fixed (e.g., fixed by using a separate E-ring 291_1). A diameter of the first fixing part 251 may be formed to be smaller than diameters of the second link hole 271b, the third link hole 271c, and the first fixing part hole 221_2a of the first wings 221_2.

The second fixing part 252 may have substantially the same shape as that of the first fixing part 251. The second fixing part 252 may be disposed at a location that is symmetrical to the first fixing part 251 with respect to an x axis center of the fixing bracket 213, and at least a portion thereof may be inserted into and fixed to a second fixing part hole 222_2a of a second wing 222_2 of the second arm part 222 and the sixth and seventh link holes 272b and 272c of the second link 272.

The first am part 221 may include a first arm body 221_1, a first shaft part 221_4, in which a first rotary shaft hole 221_4a, into which the first rotary shaft 231 is inserted, is formed, and the first wing 221_2, in which the first fixing part hole 221_2a, into which one side of the first fixing part 251 is inserted, is formed. At least a portion of the first arm body 221_1, for example, may have an L shape. The first shaft part 221_4 may extend from a −y axis periphery of the first arm body 221_1 in the −z axis direction, and may be formed along the −y axis periphery of the first arm body 221_1. At least a portion of the first rotary shaft 231 may be inserted into the first rotary shaft hole 221_4a. A first stopper boss 221_4b engaged with the stopper 236 may be disposed at an x axis end of the first shaft part 221_4. The first stopper boss 221_4b may restrict a rotation range of the first arm part 221 while being engaged with the stopper 236 as the first arm part 221 is rotated. The first wing 221_2 may extend from a −y axis end of the first arm body 221_1 perpendicularly in the −z axis direction. The first fixing part hole 221_2a formed to cross the x axis and the −x axis may be disposed at a −z axis periphery of the first wing 221_2. At least a portion of the first actuator 261 may be disposed between the first wing 221_2 and the first shaft part 221_4.

The second arm part 222 may have a structure that is the same as or similar to the first arm part 221. For example, the second arm part 222 may include a second arm body 222_1 corresponding to the first arm body 221_1, a second shaft part 222_4 corresponding to the first shaft part 221_4, and in which a second rotary shaft hole 222_4a, into which the second rotary shaft 232 is inserted, is formed, and the second wing 222_2 corresponding to the first wing 221_2, and in which the second fixing part hole 222_2a, into which one side of the second fixing part 252 is inserted, is formed. The above-described configuration of the second arm part 222 may be disposed to be symmetrical to the first arm part 221 with respect to the x axis. According to certain embodiments, the second rotary shaft hole 222_4a may have a shape that is similar to the first rotary shaft hole 221_4a, but the disposition forms may be different with respect to the x axis. A second stopper boss 222_4b engaged with the stopper 236 may be disposed at an x axis end of the second shaft part 222_4. The second stopper boss 222_4b may restrict a rotation range of the second arm part 222 while being engaged with the stopper 236 as the second arm part 222 is rotated. At least a portion of the second actuator 262 may be disposed between the second wing 222_2 and the second shaft part 222_4.

The third fixing part 253 may have a pin shape, of which a length in the x axis direction is longer. The third fixing part 253 may be shorter than the first fixing part 251. One side of the third fixing part 253 may inserted into the first link connecting hole 211_2a formed in the first rotary member 211, and an opposite side thereof may be inserted into the fourth link hole 271d of the first link 271. The first fixing clip 291_1 may be coupled to an end of the third fixing part 253, and may prevent the third fixing part 253 from deviating from the fourth link hole 271d.

The fourth fixing part 254 may be disposed to be symmetrical to the third fixing part 253 with respect to the x axis of the fixing bracket 213. The fourth fixing part 254 may have a structure that is the same as or similar to that of the third fixing part 253. One side of the fourth fixing part 254 may be inserted into the second link connecting hole 212_2a formed in the second rotary member 212, and an opposite side thereof may be inserted into the eighth link hole 272d of the second link 272. The second fixing clip 291_2 may be coupled to an end of the fourth fixing part 254, and may prevent the fourth fixing part 254 from deviating from the second link 272.

The first actuator 261 may include the first roller 261a (or first body part) formed long in the x axis lengthwise direction, and the first actuator shaft 261b that protrudes from the first roller 261a in the x axis direction and is coupled to the first link 271. At least a portion of the first roller 261a may be disposed in the first seating part 112 of the first housing 110. The first actuator shaft 261b may be inserted into a hole (e.g., the first link hole 271a) of the first link 271. In addition, a fixing clip may be disposed at an end of the first actuator shaft 261b inserted into the first link 271 such that the first actuator shaft 261b is prevented from deviating from the hole of the first link 271.

The second actuator 262 may have the same structure as that of the first actuator 261. For example, the second actuator 262 may include a second roller 262a (or second body part) that is formed long in the x axis lengthwise direction, and a second actuator shaft 262b that protrudes from the second roller 262a in the x axis direction, is disposed in parallel to the first actuator shaft 261b, and is coupled to the second link 272. At least a portion of the second roller 262a may be disposed in the second seating part 122 of the second housing 120. The second actuator shaft 262b may be inserted into the fifth link hole 272a of the second link 272. In addition, a fixing clip may be disposed at an end of the second actuator shaft 262b inserted into the second link 272 such that the second actuator shaft 262b is prevented from deviating from the eighth link hole 272d of the second link 272.

One side of the first rotary shaft 231 may be seated in a holding groove formed on one side of the fixing bracket 213, may be geared with the first idle gear 233, and may pass through (or at least a portion thereof is located in the structure) one side (e.g., the first rotary shaft hole 221_4a) of the first arm part 221 and one side of the stopper 236. The first rotary shaft 231 may include a first shaft body 231_1 and a first shaft gear 231_2 (or a first main gear). The first shaft body 231_1 may have a column shape, of which an x axis direction length is larger, and may have a length, by which it may pass through one side of the stopper 236 and the first rotary shaft hole 221_4a of the first arm part 221. A z axis cross-section of the first shaft body 231_1 may have a cross-section that is similar to a z axis cross-section of the first rotary shaft hole 221_4a. Accordingly, when the first arm part 221 is rotated, the first shaft body 231_1 may be rotated, and the first shaft gear 231_2 may be rotated as the first shaft body 231_1 is rotated. The first shaft gear 231_2 may deliver a rotational force to the first idle gear 233.

One end of the second rotary shaft 232 may be seated in the holding groove formed on an opposite side of the fixing bracket 213, and the second rotary shaft 232 may be geared with the second idle gear 234 and may pass through the stopper 236 and the second rotary shaft hole 222_4a of the second arm part 222. The second rotary shaft 232 may include a second shaft body 232_1 and a second shaft gear 232_2 (or a second main gear). The second shaft body 232_1 may have a length, by which it may pass through the stopper 236 and the second rotary shaft hole 222_4a. The second shaft body 232_1 may have substantially the same shape and size as those of the first shaft body 231_1. The second shaft body 232_1 may be disposed at a location that is spaced apart from the first shaft body 231_1 by a specific length. The second shaft gear 232_2 may have the same shape as that of the first shaft gear 231_2, and may be disposed on the second shaft body 232_1. A disposition location of the second shaft gear 232_2 may be symmetrical to a disposition location of the first shaft gear 231_2 with respect to an x axis center off the fixing bracket 213. When the second arm part 222 is rotated, the second shaft body 232_1 may be rotated, and the second shaft gear 232_2 may be rotated as the second shaft body 232_1 is rotated. The second shaft gear 232_2 may deliver a rotational force to the second idle gear 234.

The stopper 236 may support at least portions of the first arm part 221 and the second arm part 222 such that the first arm part 221 and the second arm part 222 are prevented from being rotated by a specific limit angle or more.

The first idle gear 233 may be disposed between the first shaft gear 231_2 and the second shaft gear 232_2, and one side thereof may be geared with the first shaft gear 231_2 and an opposite side thereof may be geared with the second idle gear 234. The second idle gear 234 may be disposed between the first shaft gear 231_2 and the second shaft gear 232_2, and one side thereof may be geared with the first idle gear 233 and an opposite side thereof may be geared with the second shaft gear 232_2. The second idle gear 234 may have substantially the same shape and size as those of the first idle gear 233.

The plurality of fixing clips 291_1, 291_2, 292_1, 292_2, 293_1, and 293_2 may be disposed such that least one configuration included in the second hinge structure 200b is rotated while the corresponding configuration is fixed not to deviate from the corresponding location. The plurality of fixing clips 291_1, 291_2, 292_1, 292_2, 293_1, and 293_2, for example, may include an E clip or a C clip. The plurality of fixing clips 291_1, 291_2, 292_1, 292_2, 293_1, and 293_2 may include the first fixing clip 291_1 that fixes the first fixing part 251 such that the first fixing part 251 is prevented from deviating from the first link 271, the second fixing clip 291_2 that fixes the second fixing part 252 such that the second fixing part 252 is prevented from deviating from the second link 272, the third fixing clip 292_1 that is coupled to a −x axis periphery of the first rotary shaft 231 to couple the first rotary shaft 231 to prevent the first rotary shaft 231 from deviating from the first rotary shaft hole 221_4a, the fourth fixing clip 292_2 that is coupled to a −x axis periphery of the second rotary shaft 232 to couple the second rotary shaft 232 to prevent the second rotary shaft 232 from deviating from the second rotary shaft hole 222_4a, the fifth fixing clip 293_1 that is coupled to an x axis end of the third fixing part 253 to prevent the third fixing part 253 from deviating from the first link 271, and the sixth fixing clip 293_2 that is coupled to an x axis end of the fourth fixing part 254 to prevent the fourth fixing part 254 from deviating from the second link 272.

Figure 5:
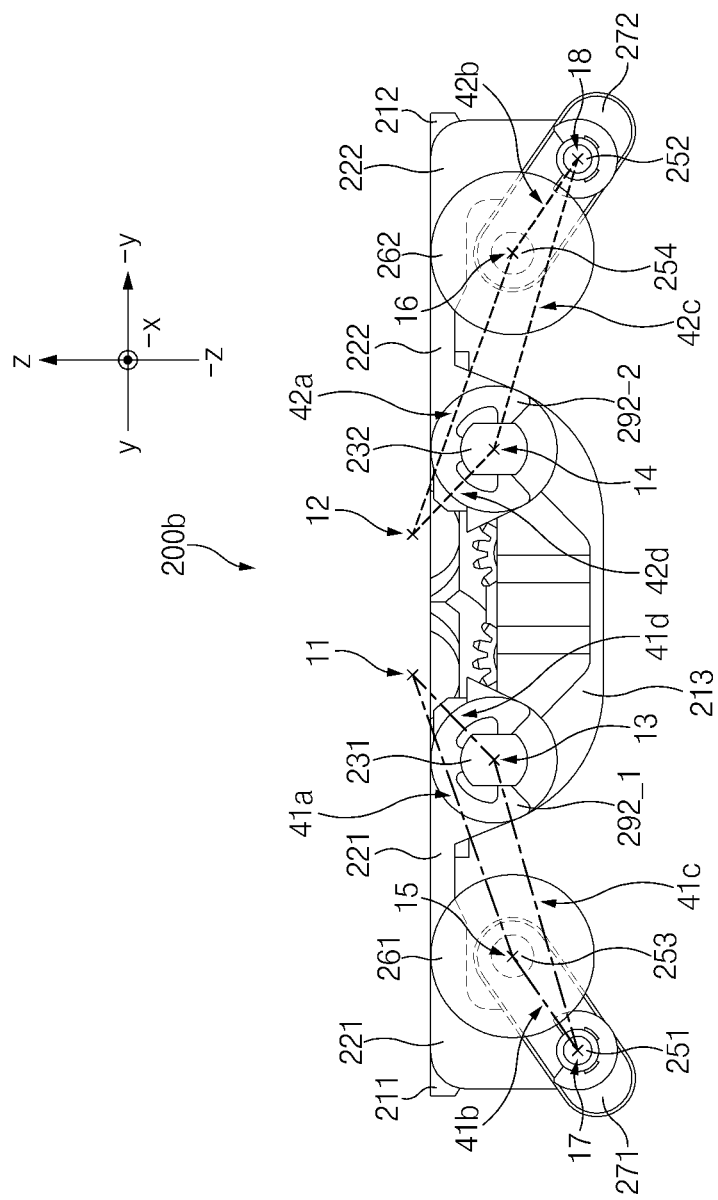
FIG. 5 is a view illustrating a rotation structure of a hinge structure in an unfolded state according to certain embodiments.
Figure 6:
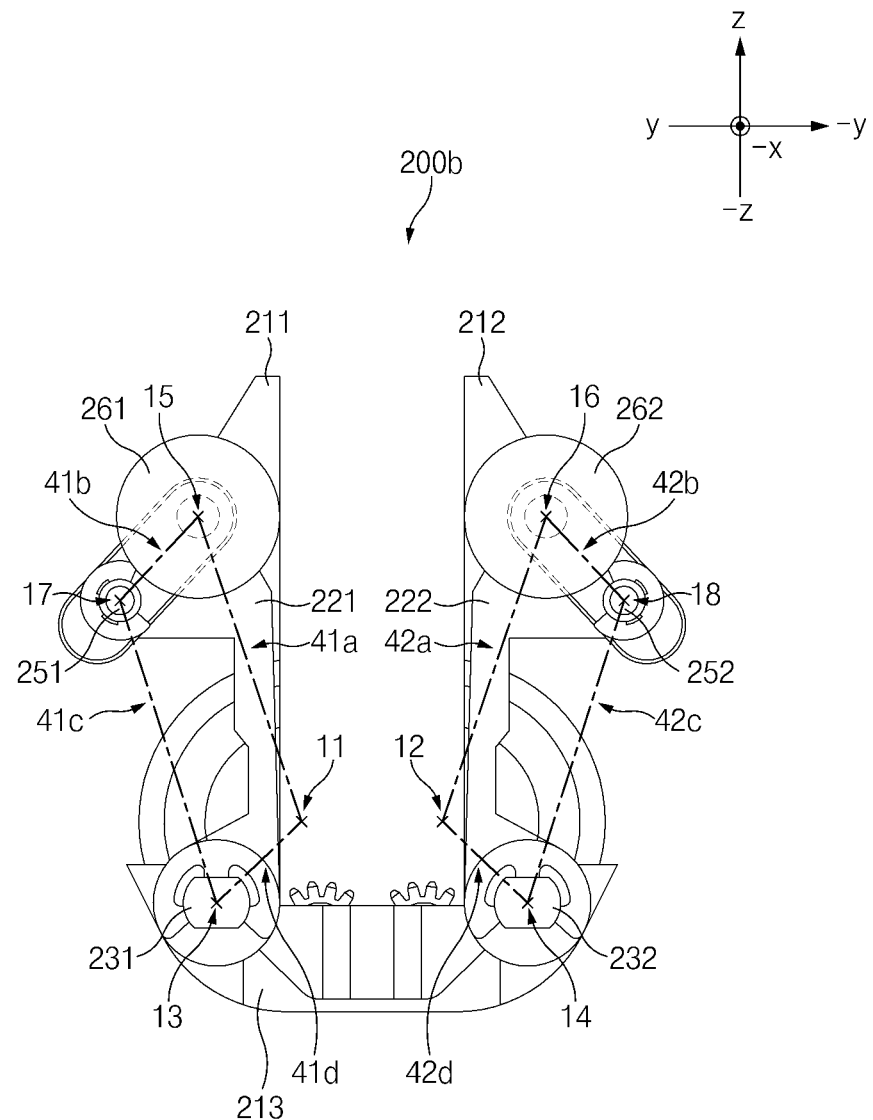
FIG. 6 is a view illustrating a rotation structure of a hinge structure in a folded state according to certain embodiments.

FIG. 5 is a view illustrating a rotation structure of the hinge structure in the unfolded state according to certain embodiments. FIG. 6 is a view illustrating a rotation structure of the hinge structure in the folded state according to certain embodiments. However, the disclosure is not limited thereto, and the hinge structure illustrated in FIGS. 5 and 6 also may be applied to the first hinge structure described in FIG. 1A in the same way.

The second hinge structure 200b may include the first rotary member 211 coupled to the first housing 110, the second rotary member 212 coupled to the first housing 110, the fixing bracket 213 coupled to the first rotary member 211 and the second rotary member 212, the first link 271, one side of which is coupled to the first rotary member 211, the second link 272, one side of which is coupled to the second rotary member 212, the first arm part 221 connected to the first rotary member 211 through the first link 271, the second arm part 222 connected to the second rotary member 212 through the second link 272, the first actuator 261 coupled to the first link 271, and the second actuator 262 coupled to the second link 272.

The first arm part 221 may be coupled to the first rotary shaft 231. The second arm part 222 may be coupled to the second rotary shaft 232. The first shaft gear 231_2 is disposed in the first rotary shaft 231. The first idle gear 233, the second idle gear 234, and the second shaft gear 232_2 are disposed in the second rotary shaft 232 and may be geared with each other, and may share a mutual rotational force when the first arm part 221 or the second arm part 222 is rotated.

In the second hinge structure 200b of the above-described structure, an upper surface of the first rotary member 211 and an upper surface of the second rotary member 212 face the z axis direction. Correspondingly, an upper surface of the first arm part 221 and the second arm part 222 may also face the z axis direction. The first rotary member 211 may be rotated about the first imaginary axis 11 through the first rail 211_3 coupled to the first rail groove 213a of the fixing bracket 213. The second rotary member 212 may be rotated about the second imaginary axis 12 through the second rail 212_3 coupled to the second rail groove 213b of the fixing bracket 213.

In the unfolded state, the first imaginary axis 11 and the second imaginary axis 12 may be formed on an upper side (air) of the upper surfaces of the first rotary member 211 and the second rotary member 212. The first arm part 221 may be rotated within a specific angle range with respect to a third imaginary axis (or third axis) 13 that is a center point of the first rotary shaft 231. The second arm part 222 may be rotated within a specific angle range with respect to a fourth imaginary axis (or fourth axis) 14 that is a center point of the second rotary shaft 232.

When the first actuator 261 is rotated in the counterclockwise direction, the first link 271 may be similarly rotated. The first arm part 221 and the first rotary member 211 that are connected to the first link 271 may be also be similarly rotated. At the same time, when the second actuator 262 is rotated in the clockwise direction, the second link 272 may be similarly rotated. The second arm part 222 and the second rotary member 212 that are connected to the second link 272 may be also be similarly rotated. As described above, when the first actuator 261 and the second actuator 262 are rotated in the counterclockwise direction and the clockwise direction, respectively, the state of the second hinge structure 200b may be changed from the unfolded state of FIG. 5 to the folded state of FIG. 6.

The first link part 271_1 of the first link 271 may be rotated about a fifth imaginary axis (or fifth axis) 15 to a specific angle. The fifth axis can correspond to a center of the third fixing part 253 or a center of the first actuator 261. The third fixing part 253 is inserted into the fourth link hole 271d. The first actuator is inserted into the first link hole 271a of the first link.

The fourth link part 272_1 of the second link 272 may be rotated about a sixth imaginary axis (or sixth axis) 16. The sixth axis may correspond to a center of the fourth fixing part 254 or a center of the second actuator 262. A seventh imaginary axis (or seventh axis) 17 may correspond to a center of the first fixing part 251. The first fixing part 251 may be inserted into the second link hole 271b and the third link hole 271c of the first link 271 may be moved as the first link 271 is rotated. An eighth imaginary axis (or eight axis) 18 corresponds to a center of the second fixing part 252. The second fixing part 252 can be inserted into the sixth link hole 272b and the seventh link hole 272c of the second link 272 may be moved as the second link 272 is rotated.

According to certain embodiments, when the first actuator 261 is rotated in the clockwise direction, the first link 271 may be similarly rotated. The first arm part 221 and the first rotary member 211 that are connected to the first link 271 may be also be rotated in the clockwise direction. At the same time, when the second actuator 262 is rotated in the counterclockwise direction, the second link 272 may be similarly rotated. The second arm part 222 and the second rotary member 212 that are connected to the second link 272 may be also be similarly rotated. As described above, when the first actuator 261 and the second actuator 262 are rotated in the clockwise direction and the counterclockwise direction, respectively, the state of the second hinge structure 200b may be changed from the folded state of FIG. 6 to the unfolded state of FIG. 5. According to certain embodiments, the first hinge structure 200a described in FIG. 1A may be disposed to be symmetrical to the second hinge structure 200b with respect to the y axis. An operation of the actuator of the first hinge structure 200a may cause rotation in the clockwise or counterclockwise direction, and correspondingly, each of the first housing 110 and the second housing 120 may be rotated in the clockwise or counterclockwise direction.

A first imaginary line (or first imaginary link) 41a may be drawn from the first imaginary axis 11 and the third fixing part 253. A second imaginary line (or second imaginary link) 41b (e.g., corresponding to the first link 271) may drawn from the third fixing part 253 to the first fixing part 251. A third imaginary line (or third imaginary link) 41c may be drawn from the first fixing part 251 and the third imaginary axis 13. A fourth imaginary line (or fourth imaginary link) 41d may be drawn between the third imaginary axis 13 and the first imaginary axis 11.

Furthermore, a fifth imaginary line (or fifth imaginary link) 42a may be drawn between the second imaginary axis 12 and the fourth fixing part 254. A sixth imaginary line (or sixth imaginary link) 42b may be drawn between the fourth fixing part 254 and the second fixing part 252. A seventh imaginary line (or seventh imaginary link) 42c may be drawn between the second fixing part 252 and the fourth imaginary axis 14 (e.g., corresponding to a center of the second rotary shaft 232). An eighth imaginary line (or eight imaginary link) 42d may be drawn between the fourth imaginary axis 14 and the second imaginary axis 12.

The first imaginary line 41a may correspond to the fifth imaginary line 42a, and may maintain the same length. In the same way, the second imaginary line 41b, the third imaginary line 41c, and the fourth imaginary line 41d may correspond to the sixth imaginary line 42b, the seventh imaginary line 42c, and the eighth imaginary line 42d, respectively, and may maintain the same length. In correspondence to a change in the folded or unfolded state of the second hinge structure 200b, included angles between the imaginary lines may be changed. For example, while the state of the foldable electronic device 100 is changed from the unfolded state to the folded state, an angle between the first imaginary line 41a and the second imaginary line 41b and an angle between the fifth imaginary line 42a and the sixth imaginary line 42b may become gradually smaller, and an angle between the first imaginary line 41a and the fourth imaginary line 41d and an angle between the fifth imaginary line 42a and the eighth imaginary line 42d may become gradually larger. Furthermore, while the state of the foldable electronic device 100 is changed from the unfolded state to the folded state, an angle between the second imaginary line 41b and the third imaginary line 41c and an angle between the sixth imaginary line 42b and the seventh imaginary line 42c may become gradually larger, and an angle between the third imaginary line 41c and the fourth imaginary line 41d and an angle between the seventh imaginary line 42c and the eighth imaginary line 42d may become gradually smaller.

Figure 7:
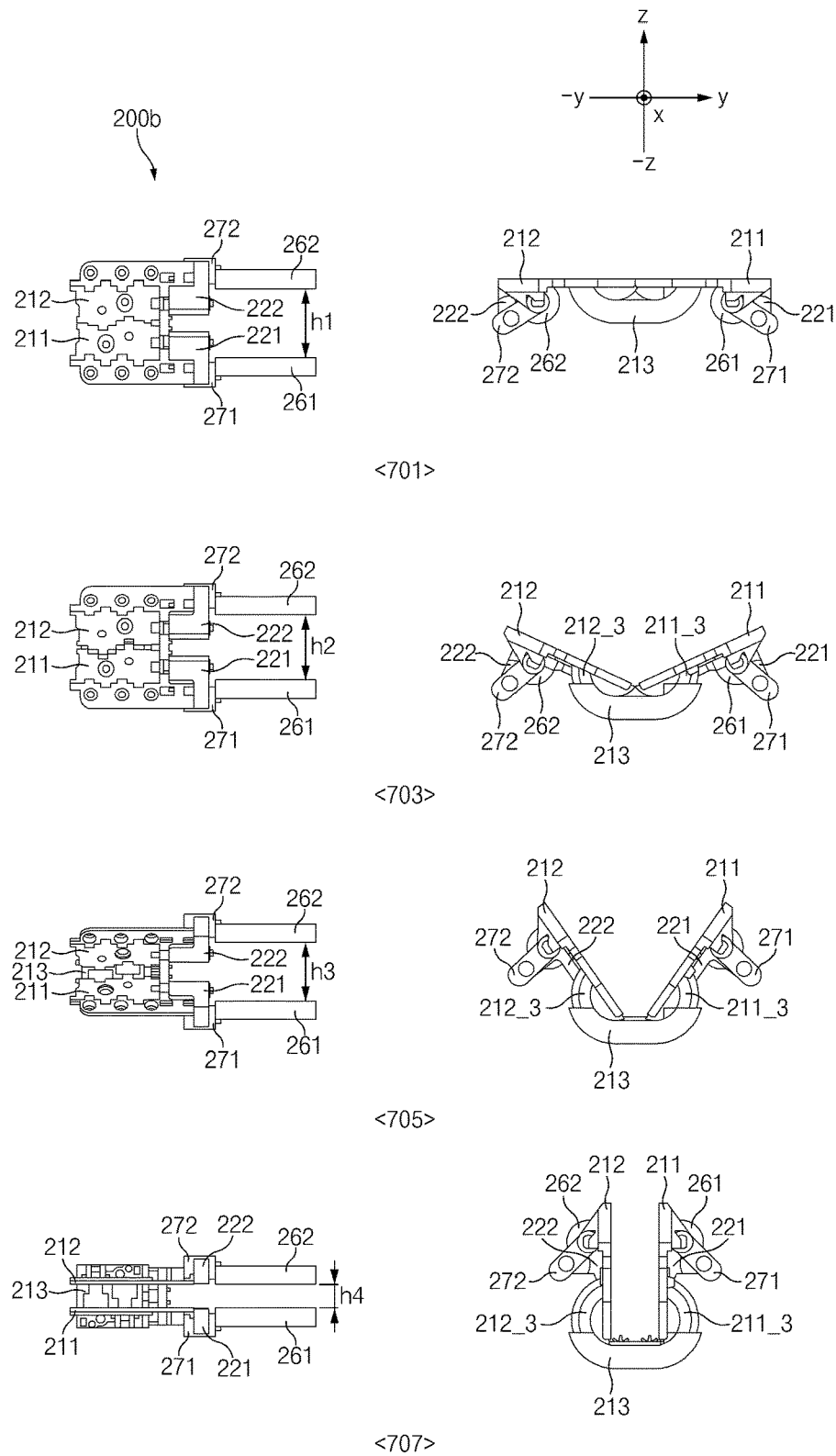
FIG. 7 is a view illustrating an example of various states of a second hinge structure according to certain embodiments.

FIG. 7 is a view illustrating an example of various states of the second hinge structure according to certain embodiments.

Referring to FIG. 7, the second hinge structure 200b may be in a fully unfolded state like state 701. For example, as the first rotary member 211 and the second rotary member 212 of the second hinge structure 200b are parallel to each other along the y axis, an angle between the upper surface (e.g., a surface in the z axis direction) of the first rotary member 211 and the upper surface (e.g., a surface in the z axis direction) of the second rotary member 212 may be 180 degrees, substantially 180 degrees, or within 3 degrees of 180 degrees (180 degrees). In this state, the first rotary member 211 and the second rotary member 212 may be coupled to the fixing bracket 213, respectively. According to an embodiment, a distance between the first actuator 261 and the second actuator 262 may be a first distance h1.

The second hinge structure 200b may be in a first holding angle state like state 703. The first holding angle of the first holding angle state between the first rotary member 211 and the second rotary member 211 may be 120 degrees, or each of the first rotary member 211 and the second rotary member 212 form a 60 degree angle with respect to the y axis. The first holding angle may be fixed when operations of the first actuator 261 and the second actuator 262 are stopped as the first actuator 261 and the second actuator 262 are in rotated states. When the second hinge structure 200b is in the first holding angle state, a portion of the first rail 211_3 of the first rotary member 211 and a portion of the second rail 212_3 of the second rotary member 212 may be extracted from the first rail groove 213a and the second rail groove 213b of the fixing bracket 213. A second distance h2 between the first actuator 261 and the second actuator 262 may be the same as the first distance h1 in state 701 above or may be a distance that is smaller than the first distance h1.

The second hinge structure 200b may be in a second holding angle state like state 705. In the second holding angle state 705, the second holding angle between the first rotary member 211 and the second rotary member 212 may be 60 degrees, or the first rotary member 211 and the second rotary member 212 may each form a 30 degree angle with the y-axis. The second holding angle may be fixed when operations of the first actuator 261 and the second actuator 262 are stopped as the first actuator 261 and the second actuator 262 are in rotated states. A third distance h3 between the first actuator 261 and the second actuator 262 may be smaller than the first distance h1 in state 701 above or the second distance h2. in state 703

The second hinge structure 200b may be in the folded state like state 707. When the second hinge structure 200b is in the folded state, one side of the first housing 110 and one side of the second housing 120 may contact each other. In the folded state, an angle between the first rotary member 211 and the −y axis may be 90 degrees or an angle that is larger than 90 degrees by a specific angle (e.g., around 10 degrees) and an angle between the second rotary member 212 and the y axis may be 90 degrees or an angle that is larger than 90 degrees by a specific angle. In the folded state, at least a portion of one surface of the first rotary member 211 and at least a portion of one surface of the second rotary member 212 may face each other. In state 707, a fourth distance h4 between the first actuator 261 and the second actuator 262 of the second hinge structure 200b may be smaller than the distances (e.g., the first distance h1, the second distance h2, and the third distance h3) in the other states.

A hinge operation may be performed while a height (e.g., a height in the z axis direction) between the upper surfaces of the first rotary member 211 and the first arm part 221 and a height (e.g., a height in the z axis direction) between the upper surfaces of the second rotary member 212 and the second arm part 222 are changed in states 701 to 707. For example, in state 701, because the heights of the upper surfaces of the first rotary member 211 and the first arm part 221 (or the second rotary member 212 and the second arm part 222) are the same, a flat shape may be maintained whereby the display 160 may be supported at the same height. In state 703 or 707, because the heights of the upper surfaces of the first rotary member 211 and the first arm part 221 (or the second rotary member 212 and the second arm part 222) are different. For example, referring to state 707, the upper surface of the first rotary member 211 and the upper surface of the second rotary member 212 may be disposed to be closer to a z axis center (or a center of the foldable electronic device 100 or a center of the fixing bracket 213) than the upper surfaces of the first arm part 221 and the second arm part 222. According to certain embodiments, when the foldable electronic device 100 is partially folded or closed, heights of surfaces of the first rotary member 211 and the second rotary member 212, which faces the rear surface of the display 160, and heights of surfaces of the first arm part 221 and the second arm part 222, which faces the rear surface of the display 160, may be different. According to certain embodiments, when the foldable electronic device 100 is partially folded or closed, surfaces of portions of the first rotary member 211 and the second rotary member 212 may be closer to the rear surface of the display 160 than surfaces of portions of the first arm part 221 and the second arm part 222, which faces the rear surface of the display 160, at a location that faces the rear surface of the display 160, which faces the folded area. In states 701 to 707, the first link 271 that connects the first rotary member 211, the first arm part 221, and the first actuator 261, and the second link 272 that connects the second rotary member 212, the second arm part, and the second actuator 262 may be rotated in an opposite direction to a direction, in which the first housing 110 and the second housing 120 are rotated.

Figure 8:
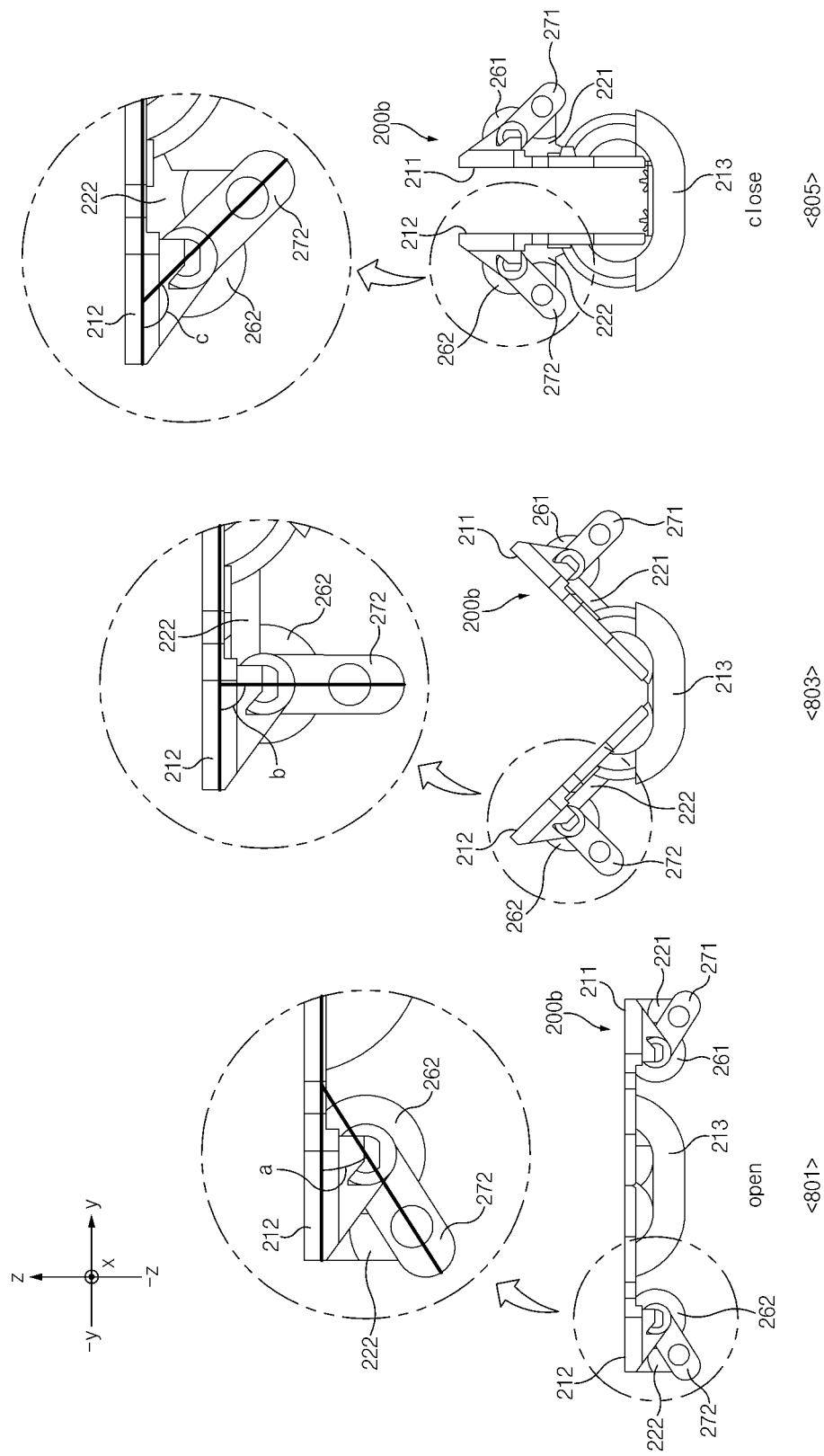
FIG. 8 is a view illustrating a change in an angle between a link and an arm part according to a change in a holding state of a second hinge structure according to certain embodiments.

In FIG. 8, the angle between the first rotary member 211 and the second rotary member 212 may be 180 degrees, 90 degrees, or folded.

FIG. 8 is a view illustrating a change in an angle between the link and the arm part according to a change in a holding state of the second hinge structure according to certain embodiments.

The second hinge structure 200b may be in a fully unfolded state like state 801. The fully unfolded state, for example, may include a state, in which the first rotary member 211 or the second rotary member 212 is not rotated further in the −z axis direction. Alternatively, the fully unfolded state may include a state, in which the first rotary member 211 and the second rotary member 212 of the second hinge structure 200b may be unfolded maximally. Alternatively, the fully unfolded state may include a state, in which an included angle between the first rotary member 211 and the second rotary member 212 of the second hinge structure 200b is 180 degrees or an angle that is close to 180 degrees. In the fully unfolded state of the second hinge structure 200b, the display 160 of the foldable electronic device 100 may be in a flat unfolded state. When the second hinge structure 200b is in the fully unfolded state, an angle (or an angle between the first rotary member 211 and the first link 271) between the second rotary member 212 and the second link 272 may be a first angle "a". The first angle "a" is for explaining an angle defined by the second link 272 and the second rotary member 212, and for example, the first angle "a" may be an angle between an arbitrary line that is parallel to the second rotary member 212 and an arbitrary line that passes a center of the second link 272 when viewed in the x axis direction.

The first actuator 261 and the second actuator 262 included in the second hinge structure 200b may be operated according to execution of a user input or a specific function of the foldable electronic device 100. As the first actuator 261 and the second actuator 262 are operated, the second hinge structure 200b in state 801 may be in a state, in which it is folded at a specific angle as in state 803. For example, in the second hinge structure 200b, an angle between the first rotary member 211 and the second rotary member 212 may be 90 degrees or an angle that is close to 90 degrees. Correspondingly, an angle between the second rotary member 212 and the second link 272 may be a second angle "b". The second angle "b", for example, may be an angle that is larger than the first angle "a". According to an embodiment, the second angle "b" may be 90 degrees or an angle that is close to 90 degrees.

When the first actuator 261 and the second actuator 262 included in the second hinge structure 200b are additionally operated, the state of the second hinge structure 200b may be changed from state 803 to state 805. For example, the second hinge structure 200b may be in the folded state. In the folded state, for example, at least a portion of the first rotary member 211 and at least a portion of the second rotary member 212 may face each other. Alternatively, the folded state may include a state, in which at least portions of the first rotary member 211 and the second rotary member 212 are disposed to be parallel to each other in the z axis direction. When the first rotary member 211 and the second rotary member 212 are disposed to be parallel to each other in the z axis direction (or upper ends of the first housing 110 and the second housing 120 of the foldable electronic device 100 contact each other), a third angle "c" may be defined between the second rotary member 212 and the second link 272. The third angle "c" may be an angle that is larger than the second angle "b". For example, the third angle "c" may be an angle between 120 degrees and 150 degrees.

As described above, the second link 272 included in the second hinge structure 200b may support hinge operations of the second rotary member 212 and the second arm part 222, center axes of which are different, because an included angle between the second link 272 and the second rotary member 212 becomes different as the second rotary member 212 is rotated. In this way, the first link 271 may support hinge operations of the second rotary member 212 and the second arm part 222, center axes of which are different, because an included angle between the first link 271 and the first rotary member 211 is changed as the first rotary member 211 is rotated. As the first link 271 and the second link 272 are rotated, the disposition states of the first actuator 261 and the second actuator 262 may be maintained in a fixed state.

Figure 9:
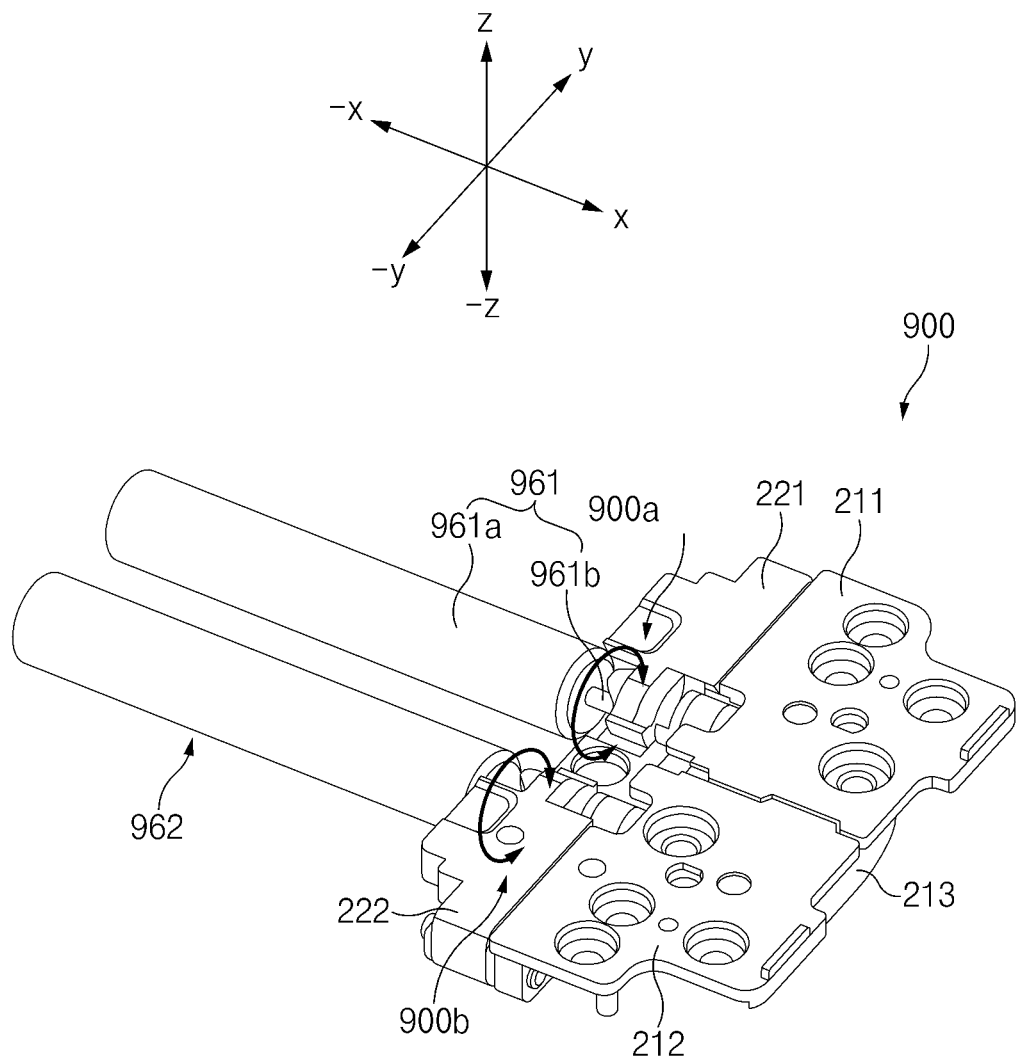
FIG. 9 is a view illustrating another example of a hinge structure according to certain embodiments.

FIG. 9 is a view illustrating another example of the hinge structure according to certain embodiments.

Referring to FIG. 9, a hinge structure 900 according to an embodiment may include the fixing bracket 213, the first rotary member 211, the second rotary member 212, the first arm part 221, the second arm part 222, a first actuator 961, and a second actuator 962.

The first actuator 961, for example, may include a first roller 961a and a first actuator shaft 961b. The first actuator shaft 961b may protrude from the first roller 961a in the x axis direction. The first actuator shaft 961b, for example, may have a rod shape that extends long in the x axis direction. At least a portion of the first actuator shaft 961b may be a flat area. According to an embodiment, at least a portion of a z axis cross-section of the first actuator shaft 961b may include a D-cut shape. The first actuator shaft 961b, for example, may be directly inserted into one side of the first arm part 221. According to certain embodiments, the second actuator 962 also may include a first roller and a second actuator shaft like the first actuator 961, and the second actuator shaft of the second actuator 962 also may be directly coupled to the second arm part 222.

In the hinge structure 900 having the above-described structure, the first actuator 961 and the second actuator 962 may be rotated in opposite directions. For example, when the first actuator shaft 961b of the first actuator 961 is rotated in a first direction 900a, the second actuator shaft of the second actuator 962 may be rotated in a second direction 900b. Correspondingly, the first arm part 221 and the first rotary member 211 coupled to the first arm part 221 may be rotated in the first direction 900a, and the second arm part 222 and the second rotary member 212 coupled to the second arm part 222 may be rotated in the second direction 900b.

According to certain embodiments, the hinge structure 900 may further include the first rotary shaft, to which the first arm part 221 is coupled, and the second rotary shaft, to which the second arm part 222 is coupled, similarly to the structure described in FIGS. 2A and 2B, and the first shaft gear may be formed in the first rotary shaft and the second shaft gear may be formed in the second rotary shaft. The first idle gear and the second idle gear may be disposed between the first shaft gear and the second shaft gear, and a rotational force may be shared. In the above-described structure, an insertion groove, into which the first actuator shaft 961b is inserted, may be formed in the first rotary shaft in the x axis direction, and an insertion groove, into which the second actuator shaft is inserted, may be formed in the second rotary shaft in the x axis direction. In the structure, when the first actuator shaft 961b of the first actuator 961 rotates the first rotary shaft, the first arm part 221 coupled to the first rotary shaft and the first rotary member 211 coupled to the first arm part 221 may be rotated in the first direction 900a. Similarly or in the same way, when the second actuator shaft of the second actuator 962 rotates the second rotary shaft, the second arm part 222 coupled to the second rotary shaft and the second rotary member 212 coupled to the second arm part 222 may be rotated in the second direction 900b.

In the above-described structure, the first actuator 961 and the second actuator 962 may be inserted into and fixed to an inside of the hinge housing 150 described in FIG. 1A. In this regard, a space, into which the first actuator 961 and the second actuator 962 are inserted, may be provided in the hinge housing 150. According to certain embodiments, the hinge structure 900 may be applied to at least one of the first hinge structure 200a and the second hinge structure 200b described above.

Figure 10:
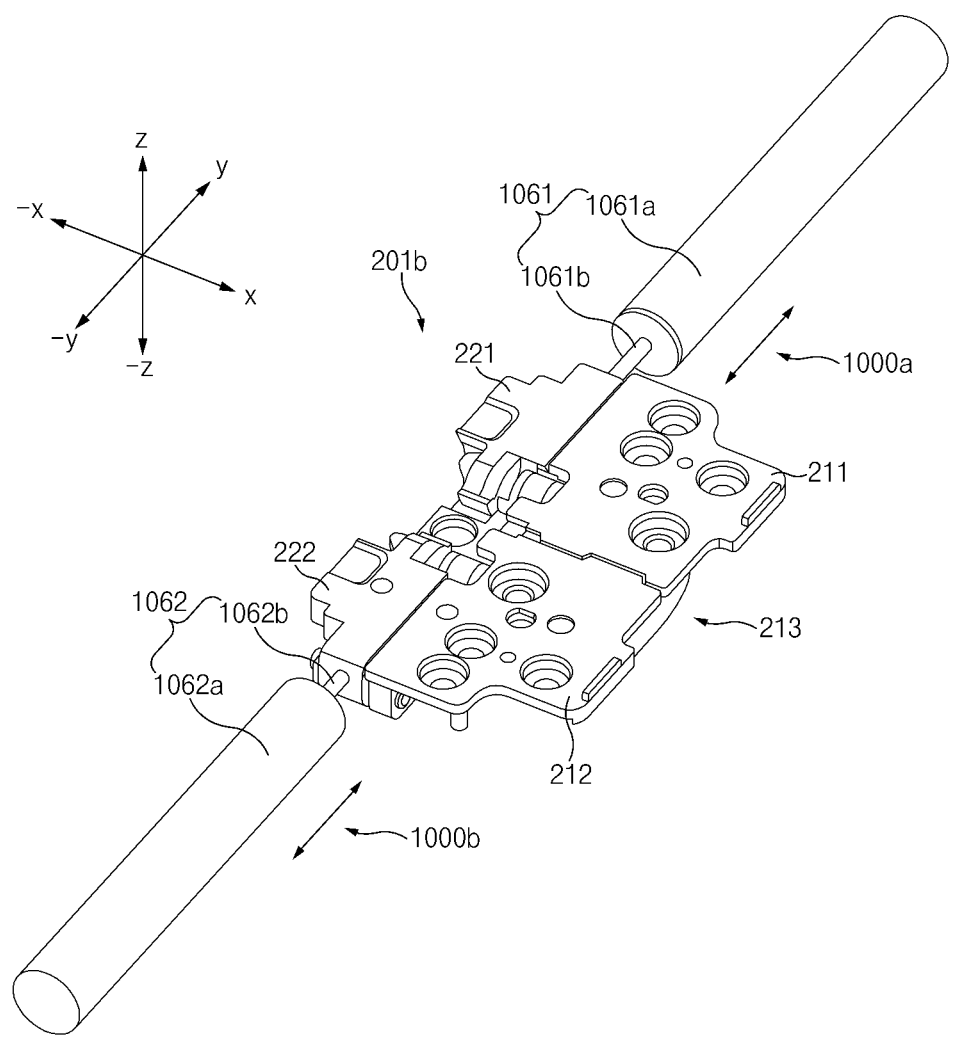
FIG. 10 is a view illustrating another example of a hinge structure according to certain embodiments.

FIG. 10 is a view illustrating another example of the hinge structure according to certain embodiments.

Referring to FIG. 10, a hinge structure 1000 according to an embodiment may include the fixing bracket 213, the first rotary member 211, the second rotary member 212, the first arm part 221, the second arm part 222, a first actuator 1061, and a second actuator 1062.

The first actuator 1061, for example, may include a first roller 1061a and a first actuator shaft 1061b. The first actuator shaft 1061b may protrude from the first roller 1061a in the -y axis direction. The first actuator shaft 1061b, for example, may have a rod shape that extends long in the -y axis direction. According to an embodiment, the first actuator shaft 1061b may be linearly moved in a first direction 1000a (e.g., in the y axis and -y axis direction or in the -y axis direction from the -y axis). A first slide hole that passes through the x axis and the -x axis and is formed long in the y axis or -y axis direction may be formed in the first rotary member 211 that is adjacent to the first arm part 221, and a first fixing part that passes through one side of the first arm part 221 and the first slide hole and is disposed in the corresponding hole may be disposed therein. The first fixing part may be linearly moved by the first actuator shaft 1061b. The first actuator shaft 1061b may be operated to push the first fixing part in the -y axis direction in the y axis, or pull the first fixing part in the y axis direction in the -y axis. When the first fixing part is moved in the -y axis direction in the y axis or in the y axis direction in the -y axis, the first arm part 221 and the first rotary member 211 coupled to the first arm part 221 may be rotated. In the same way, the second actuator 1062 may include a second roller 1062a and a second actuator shaft 1062b. Correspondingly, a second slide hole that passes through the x axis and the -x axis and is formed long in the y axis or -y axis direction may be formed in the second rotary member 212 that is adjacent to the second arm part 222, and a second fixing part that passes through one side of the second arm part 222 and the second slide hole and is disposed in the corresponding hole may be disposed therein. The second fixing part may be linearly moved by the second actuator shaft 1062b. The second actuator shaft 1062b may be linearly moved in a second direction 1000b (e.g., from the -y axis to the y axis or from the y axis to the -y axis). Alternatively, the second actuator shaft 1062b may be operated in an opposite direction to that of the linear movement of the first actuator shaft 1061b. When the second actuator shaft 1062b is moved, the second fixing part may be moved correspondingly, and as the second fixing part is moved, the second arm part 222 and the second rotary member 212 coupled to the second arm part 222 may be rotated.

According to certain embodiments, a foldable electronic device may include a first housing 110, a second housing 120, a display 160, wherein at least a portion of the display is positioned on the first housing and at least another portion of the display is disposed on the second housing, a hinge structure 200b coupling the first housing and the second housing, wherein the hinge structure may include the first rotary member 211 coupled to the first housing, the second rotary member 212 coupled to the second housing, the first arm part 221 disposed adjacent to the first rotary member, wherein at least a portion of the first arm part is at least partially inserted onto the first rotary shaft, the second arm part 222 disposed adjacent to the second rotary member, wherein at least a portion of the second arm part 222 is at least partially inserted onto the second rotary shaft, the first link 271 coupling the first rotary member and the first arm, the second link 272 coupling the second rotary member and the second arm, the first actuator 261 coupled to the first link and that provides a rotational force, and the second actuator 262 coupled to the second link and that provides a rotational force.

The first rotary member may rotate about a first axis, and the second rotary member may rotate about a second axis, and the first axis and the second axis may be formed in areas on upper sides of the first rotary shaft and the second rotary shaft in a direction of the display.

The first rotary member may rotate about a first axis, and the second rotary member may rotate about a second axis, and a distance between the first axis and the second axis may be shorter than a distance between the first rotary shaft and the second rotary shaft.

The first housing may include a seating part including a first seating area receiving at least a portion of the first actuator, and a second seating area receiving at least a portion of the first link.

The second housing may include a seating part including a first seating area receiving at least a portion of the second actuator, and a second seating area receiving at least a portion of the second link.

The first link may include a first link part including a first link hole and a second link hole, a second link part extending from one end of the first link part, and a third link part extending from one end of the second link part, the third link part including a third link hole and a fourth link hole, and disposed in parallel to the first link part.

The first actuator may include a first roller that generates a rotational force, and a first actuator shaft protruding from the first roller, wherein at least a portion of the first actuator shaft is inserted into the first link hole.

At least a portion of the first actuator shaft may include a flat area, and the first link hole has a shape that corresponds to the first actuator shaft.

The foldable electronic device may further include a fixing part, at least a portion of which is disposed in a hole of a first connecting part formed on one side of the first arm part, and the second link hole and the third link hole.

The foldable electronic device may further include a fixing part, wherein at least a portion of the fixing part is disposed in a first link connecting hole formed on one side of the first rotary member and the fourth link hole.

A height of upper surfaces of the first rotary member and the second rotary member, which facing a rear surface of the display, and a height of upper surfaces of the first arm part and the second arm part, facing the rear surface of the display, may be substantially the same when the foldable electronic device is in a fully unfolded state.

A height of surfaces of the first rotary member and the second rotary member, facing the rear surface of the display, and a height of surfaces of the first arm part and the second arm part, facing the rear surface of the display, may be different when the foldable electronic device is in a folded state.

Surfaces of portions of the first rotary member and the second rotary member may be closer to the rear surface of the display than surfaces of portions of the first arm part and the second arm part, facing the rear surface of the display, at locations that face the rear surface of the display, and a location that faces a folded area, when the foldable electronic device is in the folded state.

The foldable electronic device may further include an auxiliary display disposed on an outer side of the first housing or on an outer side of the second housing.

The display may output a graphical user interface configured to receive user inputs to control of the first actuator and the second actuator.

According to certain embodiments, a hinge structure may include a first rotary member 211 at least partially disposed in a fixing bracket 213, a second rotary member 212 at least partially disposed in the fixing bracket 213, a first arm part 221 adjacent to the first rotary member, and at least a portion of which is inserted onto the first rotary shaft, a second arm part 222 adjacent to the second rotary member, and at least a portion of which is inserted onto the second rotary shaft, a first link 271 connecting the first rotary member and the first arm part, a second link 272 connecting the second rotary member and the second arm part, a first actuator 261 connected to the first link and that provides a rotational force, and a second actuator (262 connected to the second link and that provides a rotational force.

The first rotary member may rotate about a first axis, and the second rotary member may rotate about a second axis, and the distance between the first axis and the second axis may be shorter than a distance between the first rotary shaft and the second rotary shaft.

The first link may include a first link part including a first link hole and a second link hole, a second link part extending from one end of the first link part, and a third link part extending from one end of the second link part, including a third link hole and a fourth link hole, and disposed substantially parallel to the first link part.

The first actuator may include a first roller that generates a rotational force, and a first actuator shaft protruding from the first roller to one side, and at least a portion of which is inserted into the first link hole, and at least a portion of the first actuator shaft may include a flat area, and the first link hole has a shape that is corresponding to the first actuator shaft.

The hinge structure may further include at least one of a first fixing part, at least a portion of which is disposed in a hole of a first connecting part formed on one side of the first arm part, and the second link hole and the third link hole, or second fixing part, at least a portion of which is disposed in a first link connecting hole formed on one side of the first rotary member and the fourth link hole.

Each of the components (e.g., a module or a program) according to certain embodiments may include a single or a plurality of entities, and some of the corresponding sub-components may be omitted or another sub-component may be further included in certain embodiments. Alternatively or additionally, some components (e.g., a module or a program) may be integrated into one entity to perform functions performed by the corresponding components before the integration in the same way or similarly. The operations performed by a module, a program module, or another component according to certain embodiments may be executed sequentially, in parallel, repeatedly, or heuristically, or at least some operations may be executed in another sequence or may be omitted, or another operation may be added.

Certain embodiments have been described with a degree of particularity. It shall be understood that the foregoing embodiments are not to be construed as limiting. Moreover, it shall also be understood that various modifications, and substitutions may be made without departing from the spirit and scope of this disclosure.

What is claimed is:

1. A foldable electronic device comprising:
   a first housing;
   a second housing;
   a display, wherein at least a portion of the display is positioned on the first housing and at least another portion of the display is disposed on the second housing; and
   a hinge structure coupling the first housing and the second housing; and
   wherein the hinge structure includes: a first rotary member coupled to the first housing;
   a second rotary member coupled to the second housing;
   a first arm part disposed adjacent to the first rotary member and at least partially inserted onto a first rotary shaft;
   a second arm part disposed adjacent to the second rotary member and at least partially inserted onto a second rotary shaft;
   a first link coupling the first rotary member and the first arm part;
   a second link coupling the second rotary member and the second arm part;
   a first actuator coupled to the first link and configured to provide rotational force; and
   a second actuator coupled to the second link and configured to provide rotational force.

2. The foldable electronic device of claim 1, the first rotary member is configured to be rotated about a first axis, and the second rotary member is configured to be rotated a second axis, and wherein the first axis and the second axis are formed in areas on an upper side of the first rotary shaft and an upper side of the second rotary shaft in a direction of the display.

3. The foldable electronic device of claim 1, wherein the first rotary member is configured to be rotated about a first axis, and the second rotary member is configured to be rotated about a second axis, and a distance between the first axis and the second axis is shorter than a distance between the first rotary shaft and the second rotary shaft.

4. The foldable electronic device of claim 1, wherein the first housing includes a seating part, the seating part including:
   a first seating area receiving at least a portion of the first actuator; and
   a second seating area receiving at least a portion of the first link.

5. The foldable electronic device of claim 1, wherein the second housing includes a seating part, the seating part including:
   a first seating area receiving at least a portion of the second actuator; and
   a second seating area receiving at least a portion of the second link.

6. The foldable electronic device of claim 1, wherein the first link includes:
   a first link part including a first link hole and a second link hole;
   a second link part extending from one end of the first link part; and
   a third link part extending from one end of the second link part, the third link part including a third link hole and a fourth link hole, and disposed in parallel to the first link part.

7. The foldable electronic device of claim 6, wherein the first actuator includes:
   a first roller configured to generate a rotational force; and
   a first actuator shaft protruding from the first roller, wherein at least a portion of the first actuator shaft is inserted into the first link hole.

8. The foldable electronic device of claim 7, wherein at least a portion of the first actuator shaft includes a flat area, and the first link hole has a shape corresponding to the first actuator shaft.

9. The foldable electronic device of claim 6, further comprising:
   a fixing part, at least a portion of which is disposed in a hole of a first connecting part formed on one side of the first arm part, and the second link hole and the third link hole.

10. The foldable electronic device of claim 6, further comprising:
   a fixing part, wherein at least a portion of the fixing part is disposed in a first link connecting hole formed on one side of the first rotary member and the fourth link hole.

11. The foldable electronic device of claim 1, wherein a height of upper surfaces of the first rotary member and the second rotary member facing a rear surface of the display, and a height of upper surfaces of the first arm part and the second arm part facing the rear surface of the display, are substantially the same when the foldable electronic device is in a fully unfolded state.

12. The foldable electronic device of claim 1, wherein a height of surfaces of the first rotary member and the second rotary member, facing a rear surface of the display, and a height of surfaces of the first arm part and the second arm part facing the rear surface of the display, are different when the foldable electronic device is in a folded state.

13. The foldable electronic device of claim 12, wherein surfaces of portions of the first rotary member and the second rotary member are closer to the rear surface of the display than surfaces of portions of the first arm part and the second arm part facing the rear surface of the display, at locations that face the rear surface of the display, and a location that faces a folded area, when the foldable electronic device is in the folded state.

14. The foldable electronic device of claim 1, further comprising:
   an auxiliary display disposed on an outer side of the first housing or on an outer side of the second housing.

15. The foldable electronic device of claim 1, wherein the display outputs a graphical user interface configured to receive user inputs to control of the first actuator and the second actuator.

16. A hinge structure for a foldable electronic device, the hinge structure comprising:
   a first rotary member at least partially disposed in a fixing bracket;
   a second rotary member at least partially disposed in the fixing bracket;
   a first arm part adjacent to the first rotary member, and at least a portion of which is inserted onto a first rotary shaft;
   a second arm part adjacent to the second rotary member, and at least a portion of which is inserted onto a second rotary shaft;
   a first link connecting the first rotary member and the first arm part;
   a second link connecting the second rotary member and the second arm part;
   a first actuator connected to the first link and configured to provide a rotational force; and
   a second actuator connected to the second link and configured to provide a rotational force.

17. The hinge structure of claim 16, wherein the first rotary member is configured to be rotate about a first axis, and the second rotary member is configured to rotate about a second axis, and wherein a distance between the first axis and the second axis is shorter than a distance between the first rotary shaft and the second rotary shaft.

18. The hinge structure of claim 16, wherein the first link includes:
   a first link part including a first link hole and a second link hole;
   a second link part extending from one end of the first link part; and
   a third link part extending from one end of the second link part, including a third link hole and a fourth link hole, and disposed substantially parallel to the first link part.

19. The hinge structure of claim 18, wherein the first actuator includes:
   a first roller configured to generate a rotational force; and
   a first actuator shaft protruding from the first roller to one side, wherein at least a portion of the first roller is inserted into the first link hole, and
   wherein at least a portion of the first actuator shaft includes a flat area, and the first link hole has a shape corresponding to the first actuator shaft.

20. The hinge structure of claim 18, further comprising at least one of:
   a first fixing part, at least a portion of which is disposed in a hole of a first connecting part formed on one side of the first arm part, and the second link hole and the third link hole, or a second fixing part, at least a portion of which is disposed in a first link connecting hole formed on one side of the first rotary member and the fourth link hole.

\* \* \* \* \*